(12) United States Patent
Shinozaki

(10) Patent No.: US 6,432,481 B1
(45) Date of Patent: Aug. 13, 2002

(54) RECORDING MATERIAL AND RECORDING METHOD

(75) Inventor: Kenji Shinozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/287,318

(22) Filed: Apr. 7, 1999

(30) Foreign Application Priority Data

Apr. 10, 1998 (JP) .......................................... P10-099021

(51) Int. Cl.⁷ .............................. B41M 5/00; B41M 5/26
(52) U.S. Cl. ........................ 427/256; 347/105; 427/422; 428/195; 428/913; 428/914
(58) Field of Search .................... 428/195, 913, 428/914; 427/256, 422; 347/105

(56) References Cited

U.S. PATENT DOCUMENTS 5,541,633 A * 7/1996 Wannik et al. ................. 347/98

* cited by examiner

*Primary Examiner*—Bruce H. Hess
(74) *Attorney, Agent, or Firm*—Sonnenschein, Nath & Rosenthal

(57) ABSTRACT

A recording material wherein heating causes surface tension inclination, thus generating surface tension convection which causes the recording material to fly, is used in a recording method which uses surface tension convection for causing ink to fly. This recording material has a surface tension temperature coefficient C represented by:

$|C| \geq 0.07$ (dyn/cm·K)  (Expression 1)

Thus, surface tension convection is effectively generated, thereby improving transfer efficiency.

26 Claims, 11 Drawing Sheets

RECORDING MATERIAL AND RECORDING METHOD

RELATED APPLICATION DATA

The present application claims priority to Japanese Application No. P10-099021 filed Apr. 10, 1998 which application is incorporated herein by reference to the extent permitted by law.

BACKGROUND OF THE INVENTION

1. Field of the Invention

The present invention relates to recording material, wherein heating with a heating means causes surface tension inclination, generating flow which causes the recording material to fly and be transferred onto a recording medium positioned opposing a transfer portion; and also relates to a recording method using this recording material.

2. Description of the Related Art

In recent years, in accordance with colorizing of video cameras, computer graphics, and so forth, there are increasing needs for color hard copies, not to mention black-and-white recording. With regard to such, color hard-copy printing methods which have been proposed include the dye dispersion thermal transfer method (or sublimation-type thermal transfer method), the melt thermal transfer method, the ink-jet method, the electro-photography method, the thermal-developing silver-salt method, and so forth. Of these, the dye dispersion thermal transfer method and ink-jet method can be classified as examples of methods whereby high-quality images can be easily output from relatively simple devices.

The dye dispersion thermal transfer method-uses an ink ribbon or sheet coated with an ink layer formed by dispersing a high concentration of transfer dye within an appropriate binder resin, and so-called photographic printing sheets which are formed by coating paper with dyeing resin which accepts the transferred dye. The ink ribbon or sheet is pressed against the thermal transfer sheet at a certain pressure, and a thermo-sensitive recording head (thermal head) applies heat from behind the ink ribbon or sheet, thus performing thermal transfer of transfer dye from the ink ribbon or sheet to the thermal transfer sheet, the amount of transfer dye being transferred according to the amount of heat applied to the dye receiving layer.

FIG. 16 shows the configuration of the area surrounding a thermal head of a printer using this dye dispersion thermal transfer method.

A thermal head 61 is positioned so as to oppose a platen roller 68, and an ink sheet 62 which has been formed by providing an ink layer 64 on a base film 63, for example, along with a recording sheet 65 formed by coating the surface of paper 66 with a dying resin layer (dye-accepting layer) 67, and run in the direction of the arrow A while being pressed against the thermal head 61 by the platen roller 68 which rotates in the direction of the arrow B in the Figure.

Then, the ink in the ink layer 64 selectively heated by the thermal head 61 according to the image to be printed is subjected to thermal dispersion into the dying resin layer 67 of the recording sheet 65 which has been heated by coming into contact with the ink layer 64, and transfer is carried out by dot pattern, for example.

A full-color image having continuous gradients can be obtained by repeating this operation for image signals resolved into the three primary colors of subtractive color mixture, i.e., yellow, magenta, and cyan. Much attention has been given to this dye dispersion thermal transfer method, as the printer can be reduced in size and maintenance thereof is simple, the printer has immediate availability, and images with quality rivaling that of silver-salt color photography can be obtained.

However, this method is problematic in that disposal of the ink ribbon or sheet results in massive amounts of discarded materials and high running costs, which has interfered with widespread use. This is also true for the melt thermal transfer method.

On the other hand, the ink-jet method is a method wherein droplets of recording material (hereafter referred to as "ink") are discharged from nozzles provided to a printer head according to image information, using methods such as electrostatic gravity, continuous vibration generation (piezo method), thermal (bubble-jet method), and the like, as described in Japanese Patent Publication No. 61-59911, Japanese Patent Publication No. 5-217, and so forth, whereby the flying droplets of ink adhere to the printing paper or the like, thereby conducting recording.

Accordingly, printing can be performed on plain paper, and there are hardly any discarded items generated as with the case of using ink ribbons or the like, so running costs are low. This method is becoming widespread in recent years, since color images can be easily printed with the thermal method.

However, the principle of the ink-jet method makes concentration gradients in pixels difficult, and it has been difficult to realize images with quality rivaling that of silver-salt color photography in a short time, as can be with the above-described dye dispersion thermal transfer method.

That is to say, with the known ink-jet method, one droplet forms one pixel, so this principle makes concentration gradients within pixels difficult, and accordingly, high-quality images could not be realized. Also, pseudo-gradient representations with dithering using the high resolution of ink jets is being attempted, but image quality equal to that of the sublimation type thermal transfer method has not been obtained, and moreover, the transfer speed drastically drops when employing such methods.

In order to solve such problems, a method using so-called mist has been proposed in order to miniaturize the discharged droplets in the ink-jet recording method. This method can be generally divided into (1) the supersonic oscillation method, and (2) the satellite droplet method.

The former (1) is a method wherein mainly piezo oscillators are used to generate supersonic oscillation at the discharging portions, and minute droplets (ink mist) generated by the ink liquid striking against itself due to surface tension vibration caused by this oscillation are transferred. The latter (2) uses fine droplets generated as derivatives immediately following formation of main droplets for forming images, and with this method, the main droplets are not used in the image formation.

However, with the method (1), line heads are hard to form since miniaturization of piezo devices is generally difficult, and there is also the problem of slow speed, common to piezo devices. Also, localizing supersonic oscillations is difficult, making miniaturization even more difficult, and there is much interference from cross-talk, as well. Also, the method (2) requires complicated means such as charging the main droplets and bending the course thereof so the main droplets are not transferred to the recording paper. Such a method is actually restricted to the so-called continuous ink-jet recording method, and it is difficult to realize such at low costs.

The present Applicant has found an ink mist transfer method which solves the above problems.

This is a method wherein ink is caused to fly in the form of mist, using the collision force of ink owing to surface tension convection or the like generated by turning heating means on and off, and this mist is transferred onto a recording medium, thereby forming images of high quality. (refer to Japanese Patent Application No. 10-89030 (Date of Application: Apr. 1, 1998); hereafter referred to as "Invention of Prior Application").

The Invention of Prior Application causes surface tension inclination at the surface of ink by means of resistance heating or laser beams, generating flow of ink (particularly surface tension convection or Marangoni flow) which causes the ink to fly, so ink can be caused to fly in the form of relatively large mist, this improving the transfer sensitivity per unit time. In this way, the Invention of Prior Application is a recording method which has excellent transfer sensitivity and printing speed.

With this method, providing heaters in high density can be easily realized by using known semiconductor processing techniques, and cross-talk can be prevented by providing appropriate structures on the heaters.

However, with a method which uses flow of the recording material as the driving force for causing ink to fly, as with the Invention of Prior Application, the ink must have physico-chemical qualities for generating sufficient surface tension convection; which had not been clarified in the Invention of Prior Application.

SUMMARY OF THE INVENTION

The present invention has been made in light of the above, and accordingly, it is an object of the present invention to provide recording material which effectively generates the above-described flow so as to improve transfer efficiency.

It is another object of the present invention to provide a recording method using this recording material.

As the result of careful study in order to solve the above-described problems, the present Inventor has found that, in a thermal transfer method wherein surface tension convection is used as the driving force to cause ink to fly, a suitable surface tension inclination can be brought about if the absolute value of the ink temperature coefficient is 0.07 dyn/cm·K or greater, whereby a sufficient amount of ink mist can be generated and images with sufficient color concentration can be formed.

That is, the present invention relates to a recording material, wherein heating with a heating means causes surface tension inclination, generating flow which causes the recording material to fly and be transferred onto a recording medium positioned opposing a transfer portion, the recording material having a surface tension temperature coefficient C represented by:

$|C| \geq 0.07 (dyn/cm \cdot K)$ (Expression 1)

This recording material shall hereafter be referred to as "recording material according to the present invention".

With the recording material according to the present invention, flow of recording material (particularly surface tension convection or Marangoni flow) owing to surface tension inclination causes the recording material to fly, and the recording material to be transferred to the recording medium has a surface tension temperature coefficient C represented the above in Expression 1, i.e., the recording material has an absolute value of surface tension temperature coefficient C of 0.07 dyn/cm·K or higher, so the surface tension of the recording material sharply responds to change in temperature, thus generating a sufficient surface tension inclination, consequently effectively generating the flow, thereby improving transfer efficiency.

The present invention also provides a recording method of heating recording material held in a transfer portion with a heating means to cause the recording material to fly and be transferred onto a recording medium positioned opposing a transfer portion;
wherein the recording material has a surface tension temperature coefficient C represented by:

$|C| \geq 0.07 (dyn/cm \cdot K)$ (Expression 1)

and wherein the heating causes surface tension inclination at the surface of the recording material, generating flow which causes the recording material to fly.

This recording method shall hereafter be referred to as "recording method according to the present invention".

With the recording method according to the present invention, heating recording material held in a transfer portion with a heating means causes the recording material to fly and be transferred onto a recording medium positioned opposing a transfer portion; wherein the recording material has a surface tension temperature coefficient C represented the above in Expression 1, i.e., the recording material has an absolute value of surface tension temperature coefficient C of 0.07 dyn/cm·K or higher, and wherein the heating causes surface tension inclination at the surface of the recording material, generating flow which causes the recording material to fly. So the surface tension of the recording material sharply responds to change in temperature, thus generating a sufficient surface tension inclination, consequently effectively generating the flow, thereby improving transfer efficiency.

DESCRIPTION OF THE PREFERRED EMBODIMENTS

Figure 1:
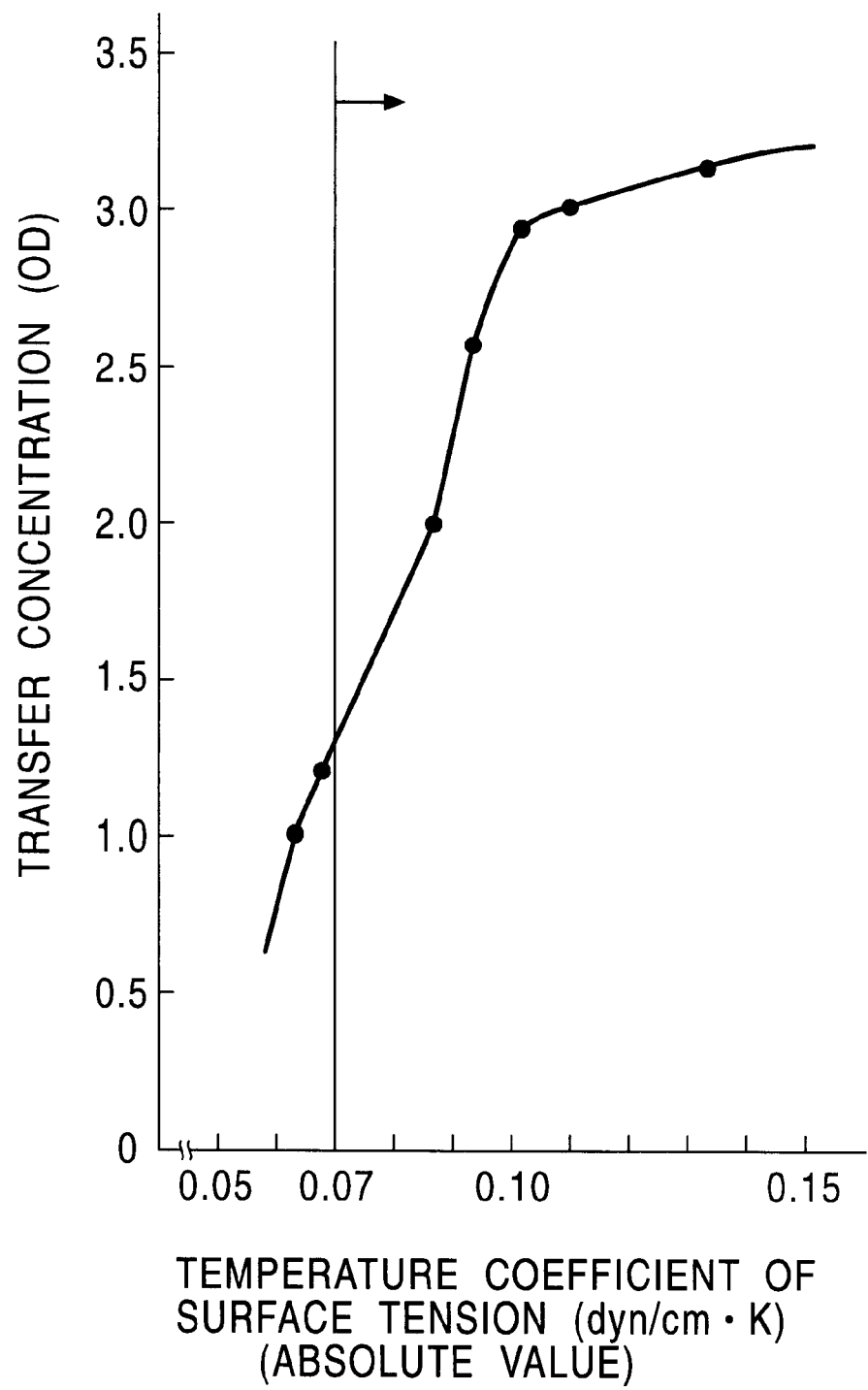
FIG. 1 is a graph illustrating change in transfer concentration according to surface tension temperature coefficients.

Description will now be made regarding the recording material according to the present invention and the recording method according to the present invention (hereafter, occasionally summarized as "the present invention").

With the present invention, the recording material may be such which flies owing to surface tension convection (or Marangoni flow), caused by the surface tension inclination. Particularly, the recording material which flies owing to surface tension convection is caused to fly as mist of 1 pico-liter or less and as mist which includes fine droplets with diameters of 2 $\mu$m or smaller.

Also, with the present invention, it is preferable that the recording material be such wherein the difference in surface tension between the area heated by the heating and the surrounding areas thereof is 5 dyn/cm or greater, and more preferably, 10 dyn/cm or greater. Generating this certain surface tension between these areas causes the surface tension convection is an effective manner, thus resulting in suitable discharge of recording material.

It is preferable that the recording material be such wherein the boiling point of the solvent thereof is 200° C. or higher, and more preferably, 300° C. or higher. This is in order to prevent the recording material from bumping during printing.

Specific examples of the solvent include at least one type of solvent selected from the following group: diphenyl sulfide, 1-phenyl naphthalene, benzyl benzoate, methyl-2-nitrobenzoate, castor oil, tricresyl phosphate, and squalane.

It is preferable that the recording material be such wherein, of dye (or pigment or coloring material), solvent and additive, the recording material comprises at least the dye and the solvent.

It is particularly preferable that the solvent accounts for 80% by weight or more in the recording material, and the dye accounts for 1% by weight or more (more preferably, 5% by weight or more) therein, and that the temperature range for maintaining the liquidity of the solvent is between –40° C. and 200° C. (more preferably between –20° C. and 100° C.).

Also, regarding the recording method according to the present invention, it is preferable that the recording material be provided with thermal inclination by heating with the heating means, and that at least the surface tension inclination is generated according to the thermal inclination, with the flow in the recording material being used as a driving force to cause the recording material to fly in a mist form. It should be noted, however, that the mist here is comprised of vaporized material, fine mist of around 1 $\mu$m in diameter, and large mist 2 $\mu$m or more in diameter.

The flow of the recording material may be generated from the heating area by the heating means toward the surrounding area, or in the reverse direction. With the characteristic configuration of the present embodiment, flow in either direction can be efficiently generated.

The flow of the recording material may be caused by at least Marangoni flow (or surface tension convection) owing to the surface tension inclination, of the following Marangoni flows:

Marangoni flow owing to the surface tension inclination of the recording material due to the temperature inclination;

Marangoni flow owing to the interface tension inclination between the recording material and the base plane of the transfer portion due to the temperature inclination;

Marangoni flow owing to concentration distribution of the material comprising the recording material; or Marangoni flow owing to selective vaporization of surface-active agents included in the recording material.

Also, with respect to the recording method according to the present invention, it is preferable that heating by the heating means is performed periodically, thereby causing the recording material to flow periodically. For example, rectangle, saw-tooth, or triangular waveform signals having certain duty, or the like, may be periodically applied to the heating means.

It is further preferable that a recording material holding structure is provided to the transfer portion, for holding the recording material by capillary phenomena. The recording material holding structure may be of a fine jagged structure, and this structure may comprise a part of the ink holding means.

Next, description will be made regarding the basic composition of the recording material according to the present invention.

The conditions for the surface tension temperature coefficient C (that |C| is 0.07 dyn/cm·K or greater) based on the characteristic configuration of the present invention is applied to the recording material as a whole. However, while recording material is basically comprised of dye, solvent, and additives, the great part (at least 80% by weight) is solvent, so the conditions for the surface tension temperature coefficient C may essentially be for the solvent.

First, the dye in the recording material for the present invention has a certain color tone, and may be a mixture of two or more types. It is preferable that this dye be included in the recording material at a ratio of at least 1% by weight to the entire amount, and more preferably, at a ratio of 5% by weight.

The types of solvents listed above can be used suitably as the solvent in the recording material according to the present invention for example, the solvent used may be a mixture of two or more types, and it is preferable that the temperature range at which the liquidity is maintained is between –40° C. to 200° C., and more preferably between –20° C. to 100° C.

Further, while additives are not absolutely necessary in the recording material according to the present invention, it is preferable that additives are added in order to adjust the viscosity of the recording material, adjust the surface tension value (particularly the surface tension temperature coefficient), improve storability of recording material, increase the solvability of the dye, and so forth. It is preferable that this additive be mixed at a ratio of 5% by weight to the entire amount or less, and need not be liquid if soluble in the solvent.

Next, the nature of the solvent will be described.

The temperature properties of the solvent used in the recording material according to the present invention are determined according to the environmental conditions under which the printer is used and the flying conditions of the ink by the heating means.

First, it is assumed that printers are generally used in an environment between −20° C. and 60° C., and it is preferable that the recording material be of a liquid form within this temperature range, at least.

Also, regarding the flying conditions of the ink by the heating means, it is preferable that the difference in surface tension between the surface of the ink heated by the heating means (i.e., the above heating area) and the surrounding areas be of a certain magnitude or greater, in order to cause recording material to efficiently fly (i.e., be transferred onto the recording medium). Particularly, 5 dyn/cm or greater, or preferably 10 dyn/cm or greater will efficiently generate surface tension convection owing to the above surface tension inclination, thereby causing a sufficient amount of ink mist to fly.

Accordingly, in the event that the absolute value of the surface tension temperature coefficient C is 0.10 dyn/cm·K for example, it is preferable that the temperature of the above heating area is at least 50° C. higher than the temperature of the surrounding areas, and more preferable if the temperature of the heating area is at least 100° C. higher than that of the surrounding areas. Incidentally, though the temperature of the surrounding area is the same as that of the environment (e.g., between −20° C. and 60° C.), this temperature will rise due to accumulation of heat as transfer continues to be carried out, to reach a maximum of around 60° C. Taking this into consideration, it can be understood that the temperature of the above heating area should be preferably be 110° C. or higher, or more preferably 160° C. or higher.

Accordingly, it is preferable that the boiling point of the overall recording material (particularly, the boiling point of the solvent) be at least this temperature or higher, with 200° C. or higher, or even 300° C. or higher being even more preferable.

Next, description will be given regarding surface tension temperature coefficients.

Though described in detail later, the main cause of surface tension convection (Marangoni flow) in the recording method according to the present invention is, e.g., the heat of the heating means provided to the base of the transfer portion being transmitted to the surface of the recording material, thereby decreasing the surface tension of the recording material immediately above the heating means so that the surface tension of the ink liquid surrounding this area which has not be heated is greater, so the surface of the recording material immediately above the heating means is pulled by the recording material at the surrounding areas (provided that the temperature coefficient C is negative).

In order for this phenomena to occur in an effective manner, the surface tension of the ink liquid must be temperature-dependent, and value thereof must be of a certain value or higher.

Let us say that the surface tension temperature coefficient of a certain liquid is represented by C, the surface tension at a temperature T by $\gamma_{(T)}$, and the reference temperature by $T_0$; the surface tension $\gamma_{(T)}$ at temperature T is as shown in Expression 2:

$$\gamma_{(T)} = \gamma_{(T-T0)} - C(T-T_0) \quad \text{(Expression 2)}$$

A variation of this Expression 2 represents the temperature coefficient C in the following Expression 3 as follows:

$$C = \gamma_{(T-T0)} - \gamma_{(T)}/(T-T_0) = -\{\gamma_{(T)} - \gamma_{(T-T0)}/(T-T_0)\} \quad \text{(Expression 3)}$$

According to the present invention, the absolute value |C| of the surface tension temperature coefficient C should be $|C| \geq 0.07$ as shown in Expression 1; in the event that the surface tension temperature coefficient C is −0.07 dyn/cm·K or less, surface tension flow is generated by the above heating from the heating area toward the above surrounding areas (non-heated areas), and in the event that the surface tension temperature coefficient C is +0.07 dyn/cm·K or greater, surface tension flow is generated from the surrounding areas toward the heating area.

Though described in detail later, with the present invention, keeping the surface tension temperature coefficient C at 0.07 (dyn/cm·K) or greater as expressed in Expression 1 achieves a transfer concentration (OD) of 1.5 or greater, which is considered to be the bare minimum for practical recording methods. Further, it is preferable to have the surface tension temperature coefficient C at 0.08 (dyn/cm·K) or greater, in order to achieve a transfer concentration (OD) of 1.7 or greater and it is further preferable to have the surface tension temperature coefficient C at 0.10 (dyn/cm·K) or greater, in order to achieve a transfer concentration (OD) of 2.5 or greater. It is particularly preferable to have the surface tension temperature coefficient C at 0.11 (dyn/cm·K) or greater, in order to achieve a transfer concentration (OD) of 3.0 or greater (See FIG. 1). Incidentally, the maximum surface tension temperature coefficient C of the solvents capable of dissolving the above dye is around 0.16 (dyn/cm·K) at the present.

Next, the principles of the recording method according to the present invention will be described.

FIG. 2 is a model representation of an example of the transfer principle of the recording method according to the present invention, owing to Marangoni flow.

Figure 2A:
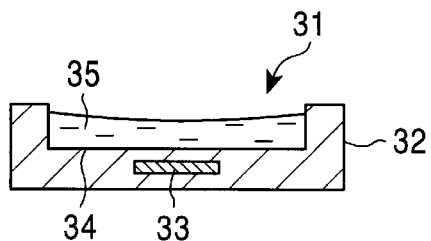
FIGS. 2A through 2G are model diagrams for describing the transfer principle based on the recording method according to the present invention.

As shown in FIG. 2A, when a heater 33 on a transfer portion 31 upon which the thickness of ink 35 is restricted by ink holding means (equivalent to the walls or jagged structures) 32 is heated, there is thermo-conduction of the heat of the heater 33 to the surface of the ink 35, and the surface tension of the ink 35 at this heating area drops.

Figure 2B:
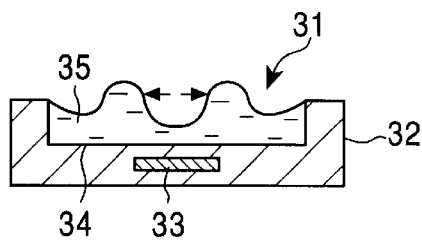

Then, the ink directly over the heater 33 is pulled by the ink with relatively high surface tension at the perimeter of the heater (i.e., the surrounding areas), and the liquid surface changes so that progressive waves moving in an outward direction (in the direction of the arrows in the Figure) are generated in the ink, as shown in FIG. 2B.

Figure 2C:
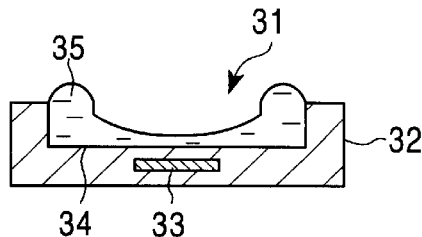
Figure 2D:
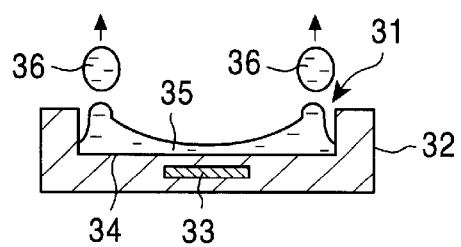

Next, as shown in FIG. 2C, when the progressive waves moving in the outward direction collide with the ink holding means 32, the speed component of the progressive waves in the ink is guided upwards, so the liquid surface of the ink bulges upwards following the ink holding means 32, and then part of the ink is sprayed upwards as mist 36, as shown in FIG. 2D.

Figure 2E:
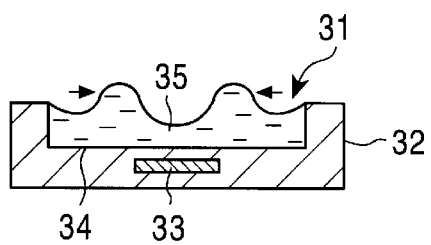
Figure 2F:
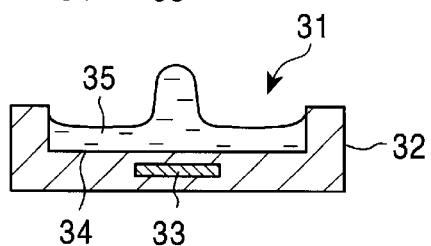
Figure 2G:
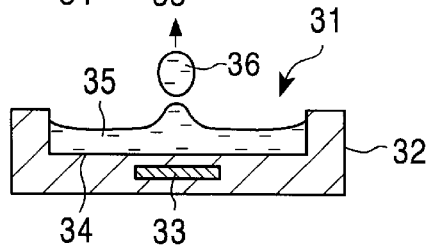

Next, heating of the heater 33 is stopped and the ink surface is cooled, which causes the difference in surface tension between near the heater (i.e., the heating area) and around the heater (i.e., surrounding areas) to decrease, so that progressive waves moving in an inward direction in the Figure are generated in the ink, as shown in FIG. 2E, due to meniscus recovery or due to capillary force of the exposed transfer portion surface. When the progressive waves moving in an inward direction collide at the center of the heater for example, as shown in FIG. 2F, part of the ink is sprayed upwards as mist 36, as shown in FIG. 2G. Periodically repeating this operation sprays a constant ink mist. In this case, the base 34 of the transfer portion 31 is not exposed.

The transfer principle of the recording method according to the present invention can be divided into the following four types, including the mechanism described with reference to FIG. 2.

(1) Collision of Progressive Waves Moving in an Outward Direction with the Ink Holding Means Progressive waves moving in an outward direction which have been generated in accordance with the Marangoni flow at the time of heating (i.e., progressive waves moving from the heating area to the surrounding areas) collide with the ink holding means, i.e., structures including or resembling walls or grooves, openings in lids with openings, post-like structures, cone-like structures, or like jagged structure groups, whereby the sideways speed component of the progressive waves is converted to a direction toward the recording medium, and the ink is sprayed toward the recording medium mainly as a mist of 1 pico-liter or less.

(2) Collision of Progressive Waves Moving in an Inward Direction with the Ink Holding Means Progressive waves moving in an inward direction which have been generated in accordance with resolution of the Marangoni flow at the time of cooling (i.e., progressive waves moving from the surrounding areas to the heating area) collide with the ink holding means, i.e., structures including or resembling walls or grooves, openings in lids with openings, post-like structures, cone-like structures, or like jagged structure groups, whereby the sideways speed component of the progressive waves is converted to a direction toward the recording medium, and the ink is sprayed toward the recording medium mainly as a mist of 1 pico-liter or less.

(3) Collision of Progressive Waves with progressive Waves

Periodically repeating heating and cooling of the heating means causes collision of the progressive waves moving in an outward direction, generated in accordance with the Marangoni flow at the time of heating, with the progressive waves moving in an inward direction, generated in accordance with resolution of the Marangoni flow at the time of cooling, whereby the sideways speed components of the progressive waves are converted to a direction toward the recording medium, and the ink is sprayed toward the recording medium mainly as a mist of 1 pico-liter or less. Collisions of progressive waves with progressive waves are not limited only to the center of heating.

(4) Resonance with Standing Waves

Resonance occurs between the natural oscillations of standing waves in the ink that are defined by spatial dimensions of the ink holding means, i.e., structures including or resembling walls or grooves, openings in lids with openings, post-like structures, cone-like structures, or like jagged structure groups, and by the surface tension of the ink, with cyclic oscillations formed by progressive waves moving in an outward direction, generated in accordance with the Marangoni flow at the time of heating, with progressive waves moving in an inward direction, generated in accordance with resolution of the Marangoni flow at the time of cooling; whereby the amplitude of the standing waves increases, and in the event that this amplitude exceeds a certain range, the ink at the loop of the vibration is finally sprayed toward the recording medium mainly as a mist of 1 pico-liter or less.

With the ink mist generated by these transfer principles, the driving frequency can be raised since the meniscus recovery of the ink is faster than with ink particles sprayed with the known ink-jet method, and the size of the ink mist sprayed can be greatly reduced. That is to say, smaller droplets can be formed in a shorter time, as compared with the known ink-jet method. Accordingly, multi-value concentration gradation can be achieved within a pixel, and recording images of a high quality (e.g., full-color images) rivaling or surpassing that of the silver-salt method can be achieved without an ink ribbon. Such quality is impossible with known on-demand type ink-jet information forming methods.

Also, the recording method according to the present invention discharges ink as relatively large mist, so there is no need to heat a dying layer on the recording material as with known dye-vaporization thermal transfer methods (e.g., Japanese Unexamined Patent Publication No. 9-183239), and the ink sheet and recording medium do not have to be pressed one against another at high pressure, which is advantageous from the point of reducing size and weight. Further, the dye layer of the recording material and the recording medium are not in contact, so not only is thermal fusion therebetween made impossible, but the compatibility between the dye and the receiving resin layer can be low and still realize recording. Accordingly, the range of design and selection for the dye and receiving resin layer is markedly widened. Further, the fact that relatively large mist particles are included means that the transfer sensitivity is high (i.e., printing speed is fast), and the reproducibility hardly changes from one type of printing material to the next. also, sufficient transfer sensitivity can be realized with a relatively small power supply, and ink is caused to fly while being made to flow, so scorching of the transfer portion due to residual impurities in the ink such as minute amounts of silica particles, metal dust, etc., can be prevented, thus suppressing deterioration in capabilities over time.

Examples of the advantages of the recording method according to the present invention further include: lowering of costs, reduction in printing time, and reduction in the amount of waste generated by printing. That is to say, this method uses a principle wherein an expensive ink ribbon is unnecessary, and can print on inexpensive plain paper by means of using ink which has high absorption properties to plain paper. Not using an ink ribbon drastically reduces the amount of waste as compared to the sublimation thermal transfer method, of course. Also, long transfer heads can be easily realized, so simultaneously driving printer heads with the three primary colors or printer heads with the four colors consisting of the three primary colors and black markedly reduces the transfer time in comparison with the sublimation thermal transfer method or on-demand ink-jet method.

Incidentally, with the recording method according to the present invention, means for improving the discharge efficiency of the ink mist can be generally categorized into two means.

The first means consists of restricting the heating output (power), heating cycle, surface tensions of ink at the time of heating and cooling, interface tension between the ink and printer head at the time of heating and cooling, size of heating means, the thickness of the ink layer, etc., so that at least part of the base of the transfer portion is exposed at the time than an ink from the heating area toward the surrounding areas is generated, in the case of periodically oscillating the ink surface on the transfer portion. The border between the ink surface and the exposed surface of the transfer portion formed by exposing the surface of the transfer portion, i.e., the gas-solid-liquid line has a fast speed of progression, and the capillary force for covering the exposed surface thus temporarily formed with ink at the time of cooling is also added, so not only is the efficiency of discharging ink mist improved, but the driving frequency can also be improved.

The second means consists of forming minute jagged structures on the heating area of the transfer portion, so as to cause interaction between the cyclical flow of the ink surface and the jagged structures, thereby improving the efficiency of discharging ink. The recovery of the ink surface at the transfer portion is improved by the capillary action owing to the jagged structures, thereby improving the driving frequency of discharging mist, and the stability of transfer is also improved by the surface level of the ink being constant at the tip of the jagged structures.

Though the means of exposing the base of the transfer portion and the means of forming minute jagged structures near the heating area of the transfer portion each exhibit individual advantages, but applying both means does not reduce the advantages of each in any way; rather, synergetic effects of the collision of the gas-solid-liquid line with the minute jagged structures causing improved mist discharging efficiency can be obtained.

There are two modes for causing oscillation of the above gas-solid-liquid line. Namely, (1) Oscillation whereby at least part of the base of the transfer portion is exposed when heating, and wherein the base of the transfer portion is completely covered with ink at the time of cooling, and (2) Oscillation whereby at least part of the base of the transfer portion is exposed when heating, and wherein the base of the transfer portion is not completely covered with ink at the time of cooling either, with at least part of the base of the transfer portion remaining exposed.

The former (1) tends to generate relatively large mist particles at the center of transfer by progressing waves in the ink colliding at the time of the exposed transfer portion base being resolved. The latter (2) easily exhibits resonance in the oscillating gas-solid-liquid line between spatial dimensions of the ink holding means standing waves in the ink restricted by the surface tension of the ink, and tends to generate relatively small mist particles at the areas around the heating means of the transfer portion. However, it should be noted that the gas-solid-liquid line is also resolved for the latter driving method as well, at the certain intervals for transferring a pixel.

The form of the minute jagged structures suitably formed on the heating area of the transfer portion include post-like structures, conical structures, interrupted conical structures, etc., but structures of any form may be used as long as the above capillary action can be obtained. Particularly, arrangements wherein the cross-section of the post-like structures, conical structures, interrupted conical structures, etc. is a circle, ellipse, triangle, polygon such as a square, etc., are suitable. Further, polygonal cross-sections formed in cross-like or star-shaped formations with angles of 180° or greater are preferable for the minute jagged structures, since the relative surface area of the minute jagged structures increases. Also, structures such as valves formed by forming irregular minute jagged structures encourage turbulence in the ink flow based on the Marangoni flow, thus increasing the shearing force of the liquid, hence improving the efficiency of discharging the ink mist.

It is preferable that the size of the minute jagged structures be 1 μm or greater but 50 μm or less in height, 1 μm or greater but 10 μm or less in representative width dimensions, and 2 μm or greater but 40 μm or less between the centers of neighboring minute jagged structures. It is particularly preferable that the size of these minute jagged structures be 2 μm or greater but 10 μm or less in height, 2 μm or greater but 5 μm or less in representative width dimension, and 3 μm or greater but 10 μm or less between the centers of neighboring minute jagged structures.

In the event that the height of the minute jagged structures is less than 1 μm, the capillary force decreases and the amount of ink held decreases, so the transfer efficiency tends to decrease. Also, in the event that the height of the minute jagged structures exceeds 50 μm, thermal conducting to the ink surface is delayed, surface tension inclination is not easily generated on the ink surface, and the amplitude of periodical oscillations at the ink surface decrease, thus tending to decrease the discharging efficiency.

In the event that the representative width dimensions of the minute jagged structures is less than 1 μm, the mechanical strength of the minute jagged structures decreases, so the minute jagged structures are easily damaged during the transfer operation or during storage, and ink may not be discharged in a stable manner. Also, in the event that the representative width dimensions of the minute jagged structures exceeds 10 μm, the relative surface area of the ink is reduced, and the mist discharging efficiency may deteriorate.

In the event that the minute jagged structures have less than 2 μm between the centers of neighboring minute jagged structures, the amount of ink held decreases, and transfer efficiency may drop. In the event that the minute jagged structures have more than 40 μm between the centers of neighboring minute jagged structures, the capillary force drops and surface oscillation becomes difficult, which may lead to deterioration in mist discharging efficiency.

Arraying the minute jagged structures in a cyclical manner facilitates generation of standing waves from oscillation of the ink surface, thereby improving discharging efficiency of the mist based on the standing waves. On the other hand, arraying the minute jagged structures in a non-cyclical (i.e., disorderly) manner facilitates turbulence from contact between the Marangoni flow of the ink and the jagged structures, thereby improving discharging efficiency of the mist based on turbulence. Accordingly, the jagged structures may either be arrayed symmetrically or non-symmetrically. In the event that the jagged structures may either be arrayed cyclically, two-fold symmetry, three-fold symmetry, four-fold symmetry, etc., is preferable, since standing waves are easily generated from the ink surface oscillation.

Examples of the minute jagged structures include structures formed by embossing, by photo-etching using photo-sensitive resin, by wet etching with photo-sensitive resin as a mask, by etching using semiconductor processes, etc. Particularly, etching using semiconductor processes is most preferable for precisely forming the most suitably-sized minute jagged structures with 2 μm or greater but 10 μm or less in height, 2 μm or greater but 5 μm or less in representative width dimension, and 3 μm or greater but 10 μm or less between the centers of neighboring minute jagged structures. An example of such means is an arrangement wherein an $SiO_2$ layer is formed on a certain substrate having heating means to a thickness of around 10 μm by CVD, then a certain pattern is formed of photo resist or a metal mask corresponding with the form of the minute jagged structures, following which depression are formed to a thickness of around 8 μm for example using RIE or powder beam etching, so that the masked portions form protrusions, thereby forming the desired minute jagged structures.

Another arrangement is to form a certain pattern with photo-resist so as to correspond with the minute jagged structures, (i.e., in a negative-positive inversion form), and then form the jagged structures out of nickel or the like by electrolytic plating. In this case, there is the need to form an electro-conductive layer beforehand to serve as a base layer. This method for forming the minute jagged structures with electroplating allows the minute jagged structures to be formed in an extremely short time in comparison with the method for forming the minute jagged structures of the $SiO_2$ layer, and thus has excellent productivity, since the time-consuming processes such as forming the $SiO_2$ layer, forming the metal mask, etching the $SiO_2$ layer, etc., can be omitted.

Incidentally, the recording medium holding structure in the recording method according to the present invention is not restricted to the above jagged structure; rather, a collection of beads, a woven material, etc., may be used, so long as the same functions are exhibited.

With the recording method according to the present invention, the thickness of the ink governs the magnitude of the Marangoni flow, so the thickness of the ink should perpetually be kept at a constant level. To this end, a wall should be provided to surround at least one side of the heating means. The height of the wall for optimizing the thickness of the ink is 1 $\mu$m or higher, but 50 $\mu$m or lower.

In the event that the height thereof is less than 1 $\mu$m, the amount of ink held decreases, so the transfer efficiency may decrease. Also, in the event that the height thereof exceeds 50 $\mu$m, thermal conducting to the ink surface is delayed, surface tension inclination is not easily generated on the ink surface, and the amplitude of periodical oscillations at the ink surface decrease, thus tending to decrease the discharging efficiency. Also, forming walls on both sides of the heating means such that the heating means is situated within a groove stabilizes ink meniscus, so mist can be discharged in a stable manner. The ink surface level can be sufficiently maintained in the event that the walls are within 50 $\mu$m from the center of the heating means. Also, accessory walls of a certain form may be provided to a certain position in order to stabilize ink meniscus.

The same method for forming the above minute jagged structures may be used for forming the walls for restricting the thickness of ink, but in the event that the precision or size required of the minute jagged structures is not required for the walls, photo-etching using photosensitive resin or pasting comb-shaped metal films will suffice.

Members (lid members) having openings (holes) or slits (gaps) may be provided above the heating means to restrict the thickness of ink to an appropriate level. Placing such members over the transfer portion so as to cover the transfer portion causes the ink to form stable meniscus following the openings or slits. However, the thickness of the ink restricted by the lid member depends on whether the side planes of the openings or slits are ink-friendly or ink-repellent in nature. For example, in the event that the side planes of the openings or slits are ink-repellent, the ink reaches a line at which the openings or slits come into contact with the bottom of the lid, and the thickness of the ink is restricted to the gap between the surface of the transfer portion and the bottom of the lid. On the other hand, in the event that the side planes of the openings or slits are ink-friendly, the ink reaches a line at which the openings or slits come into contact with the side of the lid facing the recording material, and the thickness of the ink is restricted to a total value obtained by adding the gap between the surface of the transfer portion and the bottom of the lid to the thickness of the lid.

In a most simple form, this lid member can be formed by pasting a plate with holes or slits to the above walls. Particularly, grooves formed with the photo-etching method using photo-sensitive resin allow metal film to be easily applied thermally, so wall material can easily be formed. Examples of other various means which may be used include a method using anisotropic etching, a method wherein a plate provided with grooves and openings or slits is pasted to the transfer portion, etc.

This member with openings or slits is decisively different from discharging openings in the known ink-jet method called nozzles or orifices in that the size of the ink mist sprayed from the openings or slits is overwhelmingly smaller than the area of the openings or the width of the slits from which the mist is sprayed. That is, in the event that the area of the openings is around the same as that of the heating means, and the width of the slits is around the same as the dimensions of the heating means, sufficient temperature inclination is not generated at the ink surface at the openings or slits, so there is no generation of the Marangoni flow which is the primary driving force of the ink mist with the present invention. Accordingly, the above-described lids with openings or slits have completely different roles from the so-called nozzles or orifices characterizing known on-demand type ink-jet methods.

The greatest cross-sectional area of a typical ink mist particle based on the recording method according to the present invention should preferably be generally $\frac{1}{100}$ of the area or the opening or less, and $\frac{1}{10}$ of the area or the opening or less at the very largest. Conversely, in the event that the exposed area of the ink is restricted with so-called nozzles or orifices characterizing known on-demand type ink-jet methods, the exposed area of the ink decreases, so convection owing to surface tension inclination, i.e., Marangoni flow (surface tension convection), which is the primary driving force of the ink mist with the present invention, is not sufficiently generated. Accordingly, it is preferable that the thickness of the ink layer be restricted only by structures such as walls and grooves, or jagged structures or the like, and that no discharging openings such as so-called nozzles or orifices are provided.

It is preferable that the area of the openings in the lid members be within a range of 500 $\mu m^2$ to 50,000 $\mu m^2$. In the event that the area is less than 500 $\mu m^2$, the surface tension is small and Marangoni flow is not sufficiently generated. On the other hand, in the event that the area exceeds 50,000 $\mu m^2$, ink holding capabilities tend to drop. The form of this opening may be any shape, but a circle is particularly suitable for the ink to form meniscus in a stable manner, and a rectangle is suitable for obtaining sufficient resolution.

It is preferable that the average width of the slits in the above members (lid members) be within a range of 30 $\mu$m to 500 $\mu$m. In the event that the average width is less than 30 $\mu$m, the surface tension is small and Marangoni flow is not sufficiently generated. On the other hand, in the event that the average width exceeds 500 $\mu$m, ink holding capabilities tend to drop. The slot may be linear, but suitability for ensuring meniscus is improved by matching this form with the cycle of the heating means of the transfer portions.

In the event that the sides of the openings or the slits of the above member are of an ink-repelling material, it is preferable that the bottom of the lid member, i.e., the side opposite to the side facing the recording medium, be at a height of between 1 $\mu$m to 50 $\mu$m from the surface of the transfer portion. On the other hand, in the event that the sides of the openings or the slits of the above member are of an ink-friendly material, it is still preferable that the bottom of the lid member, i.e., the side opposite to the side facing the recording medium, be at a height of between 1 $\mu$m to 50 $\mu$m from the surface of the transfer portion. In either case, what is important is to control the ink surface level with the lid material or the like in a precise and stable manner, and to promptly supply ink.

In the event that the thickness of the gap wherein ink is stored, defined by the above member (lid member) and the transfer portion surface, is less than 1 μm, prompt supplying of ink may be delayed. On the other hand, in the event that the thickness of the gap wherein ink is stored, defined by the above member and the transfer portion surface, exceeds 50 μm, the ink layer becomes thick, and Marangoni flow may not sufficiently be generated. All material which satisfies the following criteria may be used as the material for the above member: high heat endurance, stability regarding ink, wettability regarding ink such that can be controlled, and mechanically strong. Examples of such materials include metal, polymers such as polyimide, ceramics, and so forth.

With the recording method according to the present invention, it is preferable that the angle of contact between the ink and the structures of the transfer portion such as bottom, walls, or grooves, or the sides of post-like, conical or likewise-formed jagged structures be 60° or less in the entire temperature range during transfer operations, in order to encourage flow of ink from the surrounding areas of the heating means toward the center of the heating means by the ink and capillary force of the surface of the transfer portion, when lowering the temperature of the heating means (i.e., when cooling).

In order to reduce the angle of contact between the ink and the structures of the transfer portion such as bottom, walls, or grooves, or the sides of post-like, conical or likewise-formed jagged structures, using porous material to form the sides of the structures of the transfer portion such as bottom, walls, or grooves, or the sides of post-like, conical or likewise-formed jagged structures, so as to increase ink-holding capabilities, is effective. Particularly, in the event that the angle of contact between the ink and the structures of the transfer portion such as bottom, walls, or grooves, or the sides of post-like, conical or likewise-formed jagged structures is 30° or less in the entire temperature range during transfer operations, the recovery of the ink improves, and the supply speed also increases, and thus such an arrangement is suitable for increased speeds.

In order to accurately restrict the thickness of the ink layer so as to discharge the ink mist in a stable manner, it is preferable to perform liquid-repelling processing on the apex portions of the structures of the transfer portion such as walls or grooves, or the sides of post-like, conical or likewise-formed jagged structures, so that the angle of contact between the ink and the structures of the transfer portion such as walls or grooves, or the sides of post-like, conical or likewise-formed jagged structures, is 75° or greater thereat, opposite to that of the side portions, thus accurately matching the thickness of the ink layer with the height thereof. For example, the contact angle with the ink can be easily made to be 75° or greater by plasma treating of a metal mask at the tip be the post-like structures serving as the jagged structures. Further, in order to make this contact angle to be 90° or greater, spin coating is performed with a non-crystalline fluorine resin such as Cytop (manufactured by Asahi Glass), following which the pattern is worked using a plasma etching device.

With the recording method according to the present invention, it is preferable that a material with a rate of thermo-conduction of 1 W/m·K or greater be used at a ratio of 90% or higher at the area near the heating means, in order to cause the thermal responsively of the areas surrounding the heating means of the transfer portion, thereby improving the driving frequency of discharging the ink mist.

With the recording method according to the present invention, it is preferable that the heating means of the transfer portion be cyclical heating means capable of driving at a frequency of 1 KHz or lower, and any such heating means may be used. Specifically examples of methods which can be used include the resistor heating method wherein heat is generated by directly supplying electricity to a resistor, the electromagnetic wave heating method wherein electromagnetic wave absorbing material is placed at part of the transfer portion or at part of the ink and irradiating external electromagnetic waves so as to heat the ink, and so forth.

As a type of the electro-magnetic wave heating means, part of the transfer portion or a part of the ink may be formed of a photo-thermal material which converts the energy of laser beams into thermal energy, operating by irradiating a focused laser beam on the above photo-thermal material. Laser sources which can be used at this time include all types of lasers, such as gas lasers, eximer lasers, solid lasers, semiconductor lasers, etc., but of these, semiconductor lasers are particularly preferable, due to the small size and low electricity consumption. In the case that a laser light source is to be used as the heating means, it is preferable to use a transparent substrate such as Pyrex or quartz glass and irradiate the laser beam from the opposite side of discharging the mist.

Also, regarding a photo-thermal converting material to add into the ink, an infra-red absorbing pigment such as a naphthalo-cyanine dye or a cyanine dye is preferable, since such does not absorb visible light and does not contaminate photographic printing paper. In this case, it is important to lower the polarity of the infra-red absorbing pigment so as to sufficiently dissolve into the ink. Also, regarding the photo-thermal converting material provided to the transfer portion, coated Carbon Black or a two-layer film of dielectric material matching the laser wavelength is preferable.

It is preferable that the heating area of the heating means be either a rectangle 50 μm or less on one side, or a circle 60 μm or less in diameter. In the event that the size of the heating area is too large, an effective temperature inclination does not occur on the ink surface, and ink discharge may be insufficient. A particularly preferable size is a rectangle 25 μm or less on one side, or a circle 30 μm or less in diameter.

With the recording method according to the present invention, the number of ink storing portions and the number of dots, and the corresponding number of heating means and transfer portions may vary, and the manner of arraying such and the sizes or the like thereof are not by any means restricted to the above description.

For example, splitting each heating means for each pixel two ways may cause progressing waves in the ink, occurring in each heating means, to interfere around the center portion of the heating means, thereby discharging mist. Further, splitting each heating means for each pixel four ways or forming these into ring shapes may cause progressing waves heating toward the center of the heating means to converge, thereby providing even higher transfer sensitivity.

With the present intention, heating the ink with the above heating means causes solvents, dye, and other additives to evaporate from the surface of the ink at a speed according to the surface temperature of the ink, as a matter of course. Such vapor and fine mist has low flying speed, and may loose the speed component during the course of flying across the gap and float through the gap instead of reaching the photographic printing paper on the other side thereof. Not only does such ink vapor and fine mist cause soiling of the photographic printing paper and deterioration of resolution, but such ink vapor and fine mist may be toxic to humans if allowed to escape from the printer. In order to suppress leaking of the ink vapor or fine mist, it is preferable that the recording method according to the present invention have a liquid-repellent cover on the transfer portion with holes of a size through which 90% or more of the discharged mist will pass, in order to transmit only the intended mist discharge and remove ink vapor and fine mist discharged as derivatives of the process. In the event that the cover is not liquid-repellent, the ink may fill the entire cover due to capillary force. This cover is not meant to hold ink, and thus has an entirely different role as compared to nozzles or orifices characterizing know on-demand type ink-jet methods.

With the recording method according to the present invention, boiling of the ink by the heating means provided to the transfer portion may cause convection owing to the surface tension inclination which serves as the driving force of the recording method according to the present invention, i.e., the Marangoni flow, to become unstable. Accordingly, the boiling point of the dye (coloring material), solvent and other additives comprising the ink should be set sufficiently high, so as to control boiling (bumping) of the ink.

In the event that the boiling points of the dye, solvent, and other additives comprising the ink differ, the component having the lowest boiling point may selectively evaporate so as to cause deviation in the components of the ink and thereby cause change in the physical properties of the ink, resulting in mist not being discharged in a stable manner. Also, in the event that the boiling point of one of the components is particularly low, one of the components may evaporate when the printer is not in operation so as to cause deviation in the components of the ink and thereby cause change in the physical properties of the ink, due to the fact that the surface of the ink is exposed to the air in the recording method according to the present invention, resulting in mist not being discharged in a stable manner. In order to prevent such, it is preferable that either the boiling points of all of the materials comprising the ink, i.e., the dye, solvent, and other additives, be set to 250° C. or higher, or, the difference in boiling points of all of the materials comprising the ink, i.e., the dye, solvent, and other additives, be within a range of 10° C.

With the recording method according to the present invention, the temperature of the ink components may reach peak temperatures of 200° C. or higher, so in the event that the thermal breakdown temperature of the ink components, i.e., the dye, solvent, and other additives, is 200° C. or lower, a part of the ink may break down, with the degradation products accumulating in the recording unit and changing the surface area, or changing the wettability with the ink, thereby resulting in unstable mist discharging. In order to prevent this phenomena, it is preferable that the point at which thermal breakdown begins for all of the materials comprising the ink, i.e., the dye, solvent, and other additives, be set to 200° C. or higher. Specifically, it is preferable to use materials which have 100 ppm of thermal breakdown products following heating at 200° C. for one hour in the air.

With the recording method according to the present invention, in order to effectively generate convection owing to the surface tension inclination (i.e., surface tension convection), i.e., Marangoni flow, the surface tension of the ink should have a certain temperature coefficient, of which the greater the absolute value is, the better.

The ink used in the recording method according to the present invention is comprised of dye, solvent, and additives added as necessary. The materials can be selected and the ratio of constitution components can be adjusted so as to optimize the transfer sensitivity, thermal stability, image quality, and storage stability.

Dye suitable for the present invention preferably satisfies the following conditions, i.e., a boiling point of 250° C. or higher, having 100 ppm or less of thermal breakdown products following heating at 200° C. for one hour in the air, sufficient solvability in the later-described solvent, and sufficient storage stability on photographic printing paper, with oil-soluble dyes with low polarity called disperse dye or oil-soluble dye being particularly preferable.

Oil-Soluble dye may include but are not limited to: KAYASET dye series (manufactured by Nippon Kayaku), DIAMIRA dye series (manufactured by Mitsubishi Chemical Corporation), Mitsui PS dye series (manufactured by Mitsui Toatsu), SUMIPLAST dye series (manufactured by Sumitomo Chemical), AIZEN dye series (manufactured by Hodogaya Chemical), and so forth.

Also, for disperse dyes, such without dispersants added are preferable, an example of such being ESC dye series (manufactured by Sumitomo Chemical). More specific examples include but are not limited to: azo dyes such as CI (Color Index) disperse yellow 3, disperse yellow 7, disperse yellow 8, solvent yellow 16, solvent yellow 56, disperse red 1, disperse red 17, disperse red 19, solvent red 19, solvent red 23, etc.; quino-phthalone dyes such as disperse yellow 54, etc.; and anthra-quinone dyes such as disperse red 4, disperse red 11, disperse red 60, disperse blue 14, disperse blue 26, solvent blue 35, etc. Other dyes which can be used are dyes having structures of dicyano-styryls, tricyano-styryls, and indo-anilines. It is preferable that such dyes be refined by means such as sublimation refining, re-crystallizing, zone melting, column refining, etc., before using, in order to reduce vaporization residue and adhesion of thermal breakdown products to the recording portion.

Solvents suitable for the present invention preferably satisfy the following conditions, i.e., melting point lower than 50° C. and a boiling point of 250° C. or higher, having 100 ppm or less of thermal breakdown products following heating at 200° C. for one hour in the air, sufficient compatibility with the above dyes, viscosity of 100 cp. or less at 100° C., low toxicity to the human body, and being colorless. Any compound may be used, so long as the above criteria and the characteristic configuration of the present invention are satisfied.

As described above, appropriate additives such as surface-active agents or viscosity adjusting agents may be added as necessary in order to adjust the physical characteristics of the ink. However, it is preferable that any such additives should have a boiling point of 250° C. or higher, 100 ppm or less of thermal breakdown products following heating at 200° C. for one hour in the air, and be colorless. Surface-active agents preferably used include surface-active agents including par-fluoro bases, and surface-active agents including silyl bases. Viscosity adjusting agents preferably used include polyethylene glycols such as tetraethylene glycol and triethylene glycol.

In the present invention, it is preferable that the distance between the ink surface on the transfer portion and the recording medium be within a range of 50 $\mu$m to 2,000 $\mu$m. In the event that the distance is less than 50 $\mu$m, mechanical precision for securing the gap cannot be easily obtained, and paper powder from the photographic printing paper or the like tends to stick to the transfer portion. Conversely, in the event that the gap exceeds 2,000 $\mu$m, the striking range of the mist expands so that the resolution tends to be insufficient.

The printer head is manufactured by forming heaters, ink channels, and jagged structures on a substrate of silicone, quartz, etc., by semiconductor process, the substrate following processing (i.e., heater chip) is cut, then pasted onto a head base, a driver IC is connected by means of wire-bonding or the like, and an ink tank is mounted, thereby forming a transfer head. The certain gap is secured by placing the head at an angle against the photographic printing paper. Also, three of the above heads containing ink of the three primary colors of subtractive color mixture can be used to print full-color images by driving according to the serial method or line method.

Concentration modulation within unit pixels can be realized by applying appropriate duty pulses of basic frequency of driving frequencies between several 10 to several 100 KHz per unit pixel, in the form of burst signals of which the number of times correspond with the number of gradients. In the event that the number of gradients is 256, the driving frequency for unit pixels will be several 100 Hz.

A point that should be noticed here with regard to the recording method according to the present invention is that, unlike known ink-jet methods, one driving pulse does not necessarily cause one discharge of mist. With reference to a typical action as an example, the first few pulses do not cause the ink surface to sufficiently accumulate heat, so the amplitude of the Marangoni flow is small and mist is not discharged, but from around the fifth pulse or so, several to several tens of fine mist particles are simultaneously discharged for each pulse. Accordingly, the driving method for the sublimation thermo-sensitivity transfer method is actually more appropriate to the recording method according to the present invention than that of the ink-jet method.

Regarding the photographic printing paper appropriate for the recording method according to the present invention, plain paper such as PPC or wood-free paper such as art paper may be used, but in order to obtain high-quality images with particularly high gradation and concentration, specialized paper manufactured by coating a base sheet with polyester, polycarbonate, acetate, CAB, polyvinyl chloride, etc., may be used. Porous pigment such as silica or alumina may be added in order to improve the absorption speed of the ink.

Laminating the photographic printing paper following transfer with a resin film is effective in improving the storage stability of the obtained image. It is particularly preferable for the surface of the photographic printing paper to be porous with holes having an average diameter of between 0.05 μm to 20 μm, in order for the discharged mist to instantly adhere thereto.

The photographic printing paper following transfer may be heated with a heater roller to disperse the ink into the photographic printing paper and fix the ink thereto.

Also, with the recording method according to the present invention, an arrangement may be employed wherein a surface-active agent having a boiling point lower than that of the solvent of the ink by 20° C. or more at normal pressure, so as to selectively vaporize the surface-active agent at the heating area at the time of driving the heating means so as to generate surface tension inclination in the ink, thereby discharging ink mist with ink flow owing to the surface tension inclination as the driving force thereof; however, such a surface-active agent should have a boiling point lower than that of the solvent of the ink by 20° C. or more at normal pressure, preferably by 50° C. or more, be colorless, have low toxicity, and be capable of changing the surface tension of the ink by 3 dyn/cm upon 1% by weight or less being added to the ink, and more preferably by 10 dyn/cm.

Specifically, fluorine surface-active agents formed by replacing a portion of the hydrogen in alcohols, fatty acids, fatty acid esters, aromatic esters, etc., with fluorine; silicone surface-active agents having syril bases in the molecular structures; etc., are particularly preferable.

As described above, the mechanism for generating Marangoni flow based on the present invention is as follows (See FIG. 2):

Driving of heating means generates temperature inclination between the heated area and surrounding areas in the recording material.

Surface tension inclination is generated according to the temperature inclination, according to the temperature dependency of the surface tension of the recording material.

Recording material flows from the high-temperature portion to the low-temperature portion, owing to the surface tensions inclination at the heating area.

However, as described above, the following three Marangoni flow generating mechanisms can be conceived aside from the above mechanism for the recording method according to the present invention.

(1) Marangoni Flow Owing to Temperature Dependency of the Interface Tension Inclination Between the Recording Material and the Base Plane of the Transfer Portion There is also temperature dependency in the interface tension between the recording material and the base plane of the transfer portion (including the walls of the jagged structures, etc.). However, actual measurement of interface tension is difficult, so just how much interface tension inclination provides to the Marangoni flow is unknown at the present time; however, there is a possibility that this is greater than a negligible amount.

(2) Marangoni Flow Owing to Concentration Distribution of the Material Comprising the Recording Material There are cases in which the dye, solvents, and other additives comprising the recording material differ in boiling points, so applying heat with the heating means selectively evaporates the components with low boiling points only. Normally, the solvent has a lower boiling point than the dye, so the solvent alone may fly and leave the dye concentrated. This creates concentration inclination in the recording material at the heating area. Also, the surface tension (or interface tension) also changes according to the constitution of the recording material, so surface tension inclination occurs according to the concentration inclination in the recording material, and consequently, a similar Marangoni flow occurs.

(3) Marangoni Flow Owing to Selective Vaporization of Surface-active Agents Included in the Recording Material In the Marangoni flow described above in (2), adding a surface-active agent with a boiling point lower than the solvent or dye in the recording material causes the surface-active agent at the heating area to be selectively evaporated from the recording material and be lost, so surface tension inclination is generated. The surface-active agent has great bearing on the surface tension, so there is a possibility that this generating mechanism may create a great Marangoni flow. Particularly, most surface-active agents tend to decrease the surface tension, so in the event that the surface-active agent is lost at the heating area, it is thought that the surface tension at the heating area becomes greater than that at the surrounding areas, opposite to that of the Marangoni flow generating mechanism described in FIG. 2, and a flow of recording material from the surrounding areas to the heating area is generated.

Now, the transfer principle of the above (1) will be described with reference to FIG. 3.

Figure 3A:
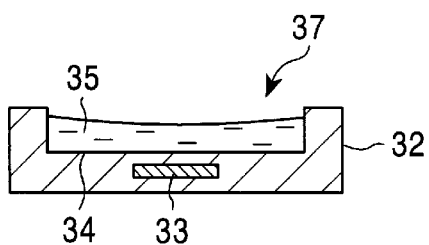
FIGS. 3A through 3G are model diagrams for describing another transfer principle according to the present invention.
Figure 3B:
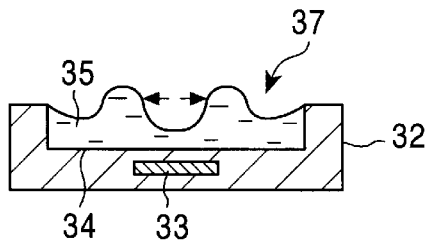

As shown in FIG. 3A, when a heater 33 on a transfer portion 37 upon which the thickness of ink 35 is restricted by ink holding means (equivalent to the walls or jagged structures) 32 is heated, the ink directly over the heater 34 is pulled by the ink with relatively high surface tension at the perimeter of the heater (i.e., the surrounding areas), and the liquid surface changes so that progressive waves moving in an outward direction (in the direction of the arrows in the Figure) are generated in the ink, as shown in FIG. 3B.

Figure 3C:
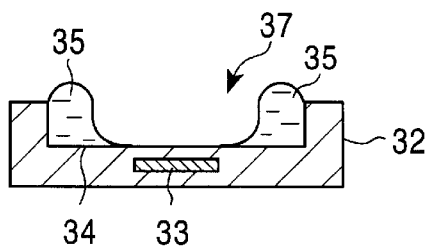
Figure 3D:
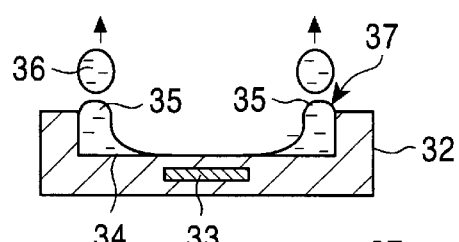

Next, as shown in FIG. 3C, as a result of the ink over the heater 33 of the transfer portion 37 (i.e., the ink at the heating area) moving to the surrounding areas, the base plane 34 directly over the heater 33 is completely exposed. As shown in the Figure, when the progressive waves moving in the outward direction collide with the ink holding means 32, the speed component of the progressive waves in the ink is guided upwards, so the liquid surface of the ink bulges upwards following the ink holding means 32, and then part of the ink 35 is sprayed upwards as mist 36, as shown in FIG. 3D.

Figure 3E:
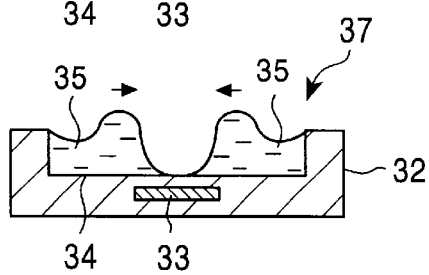

Next, heating of the heater 33 is stopped and the ink surface is cooled, which causes the difference in surface tension between near the heating area and the surrounding areas to decrease, so that progressive waves moving in an inward direction shown by the arrows in the Figure are generated in the ink, as shown in FIG. 3E, due to meniscus recovery or due to capillary force of the exposed transfer portion surface.

Figure 3F:
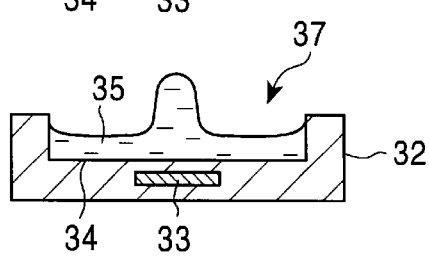
Figure 3G:
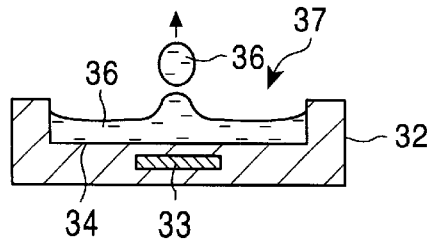

When the progressive waves moving in an inward direction collide at the heating area for example, as shown in FIG. 3F, part of the ink 35 is sprayed upwards as mist 36, as shown in FIG. 3G. Periodically repeating this operation sprays a constant ink mist. Causing the ink 35 to flow so that the base 34 is periodically exposed not only improves the discharge efficiency of the ink mist 36, but also facilitates improving of the driving frequency.

Next, the transfer principle for the above case (3) will be described with reference to FIG. 4.

Figure 4A:
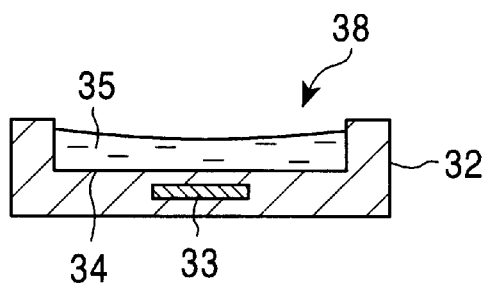
FIGS. 4A through 4F are model diagrams for describing another transfer principle according to the present invention.

As shown in FIG. 4A, disposing ink 35' which includes a surface-active agent in the ink storage portion consisting of the ink holding means 32 at the transfer portion 38 for example causes the surface-active agent to spontaneously gather to the gas-liquid interface, and form a surface-active agent film (omitted in the drawing) at the interface.

Figure 4B:
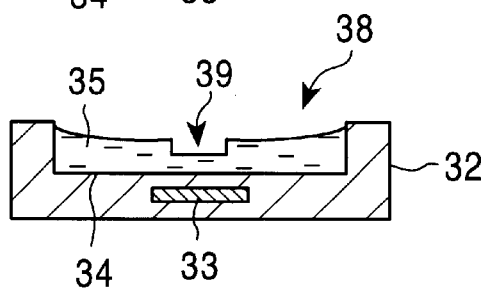

Heating the heater 33 provided to the transfer portion 38 to which ink 35' in such as state is provided causes the heat of the heater 33 to be conducted to the ink surface, so the surface-active agent with a relatively low boiling point selectively vaporizes, and as shown in FIG. 4B, a hole 39 from which the surface-active agent has been lost is formed at the portion directly over the heater.

Consequently, the surface tension of the ink directly over the heater 33 rises, and the ink at the surrounding portions is drawn toward the ink directly over the heater with relatively high surface tension, thereby generating progressing waves moving inwards.

Figure 4C:
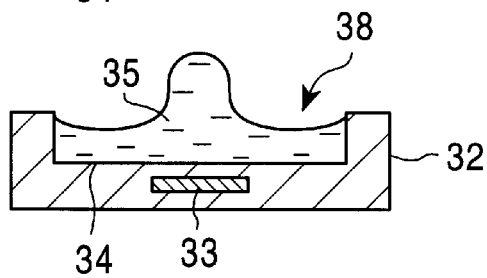
Figure 4D:
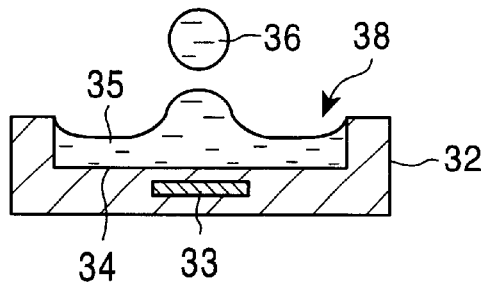

When the progressive waves moving in an inward direction collide at the heating area as shown in FIGS. 4C and 4D, the liquid surface of the ink bulges upwards at the heating area for example, and part of the ink 35' is sprayed upwards as mist 36.

Figure 4E:
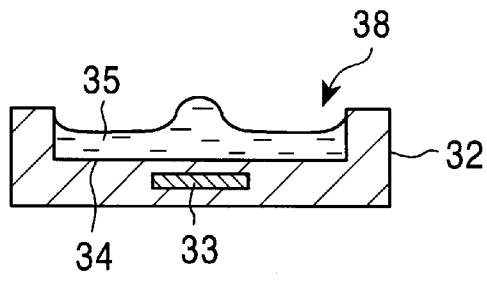
Figure 4F:
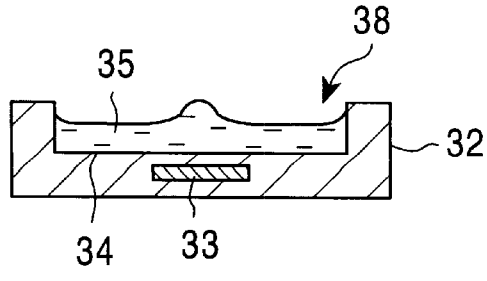

Next, when the transfer portion 38 is cooled, the surface-active agent film covers the ink 35' once again, as shown in FIG. 4E and FIG. 4F. Repeating this operation constantly sprays an ink mist.

Next, the manner in which ink flies based on the recording method according to the present invention will be described with reference to FIG. 5.

Figure 5:
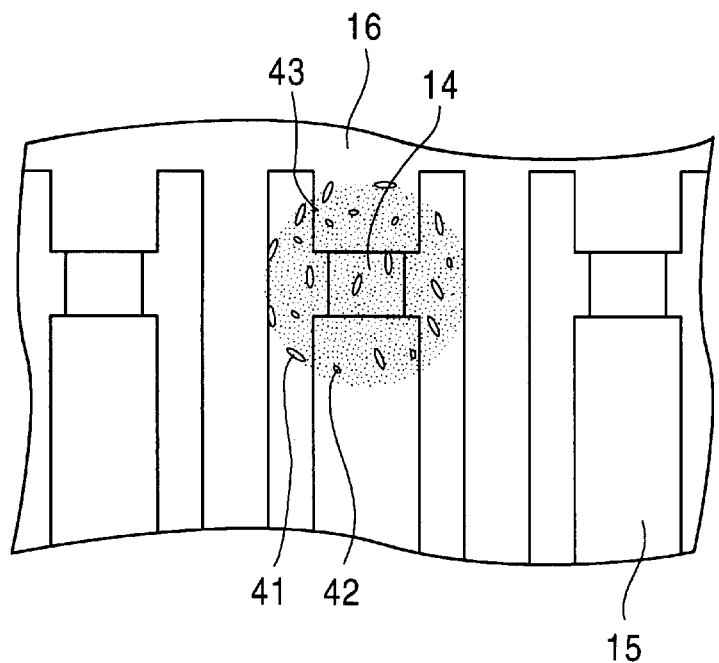
FIG. 5 is a schematic model diagram of a principal portion illustrating the manner in which ink flies with the recording method according to the present invention.

FIG. 5 illustrates the manner in which ink flow from a transfer portion having a heater 14 connected to an individual electrode 15 and common electrode 16 (equivalent to the heater 33 shown in FIGS. 2 through 4), based on the recording method according to the present invention. That is, as shown in FIG. 5, according to the recording method according to the present invention, at around 40 to 80% duty of the signal pulses applied to the heater for example, the ink flies as large mist 41 of particles 2 $\mu$m in diameter and greater along with vaporized material 43 and small mist 42, and adheres to a recording medium placed at an opposing position, but not shown in the drawings.

Figure 6:
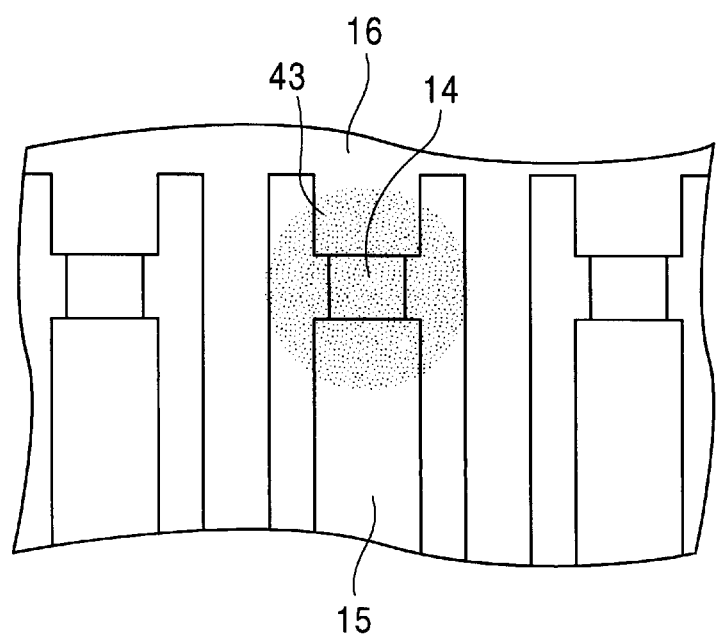
FIG. 6 is a schematic model diagram of a principal portion illustrating the manner in which ink flies with another recording method , according to the present invention.

On the other hand, as shown in FIG. 6, according to a recording method wherein signal pulses at around 80 to 90% duty are used, the ink flies as vaporized material 43 (sometimes including small mist of particles around 1 $\mu$m in diameter, generated by condensing of the vaporized material 43) and adheres to the unshown recording medium placed at an opposing position.

Thus, with the recording method according to the present invention, setting the duty and the like of the signal pulses to be applied to the heating means allows the transfer portions to be selectively heated according to image information, and the recording material to be discharged as mainly mist of 1 pico-liter or less (including mist of 2 $\mu$m or greater in diameter) according to the amount of heating, whereby ink is adhered and fixed to opposing photographic printing paper placed at an opposing position, thereby obtaining a high-quality full-color image with, e.g., 64 or more concentration gradients.

Now, an example of the configuration of a printer head which can be applied to the recording method according to the present invention will be described with reference to FIG. 7 through FIG. 10.

Figure 7:
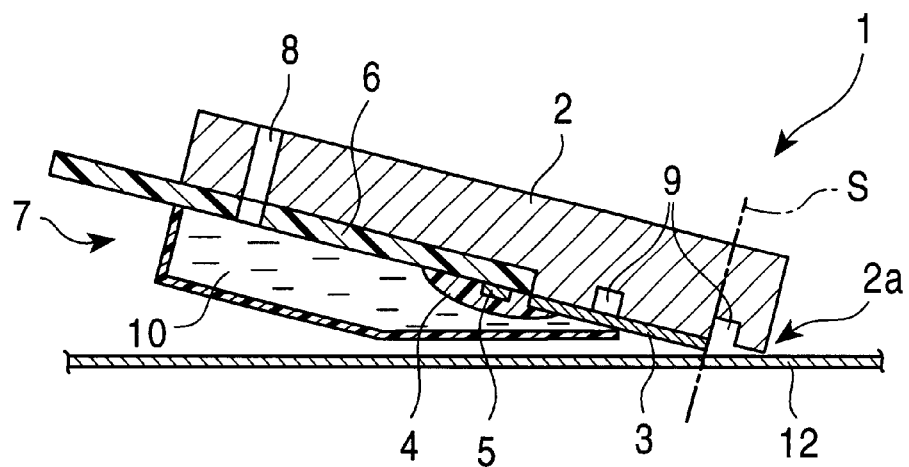
FIG. 7 is a schematic model diagram of a principal portion of a printer head based on an embodiment according to the present invention.
Figure 8:
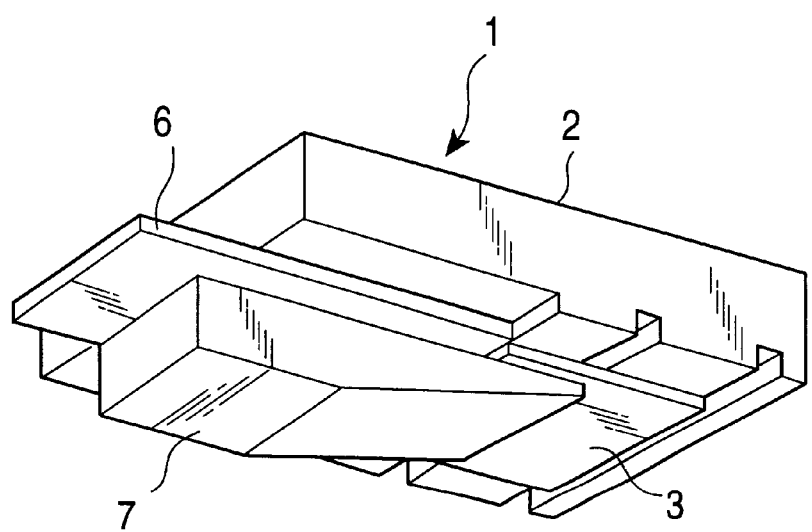
FIG. 8 is a schematic perspective view showing an external view of the printer head according to the same.
Figure 9:
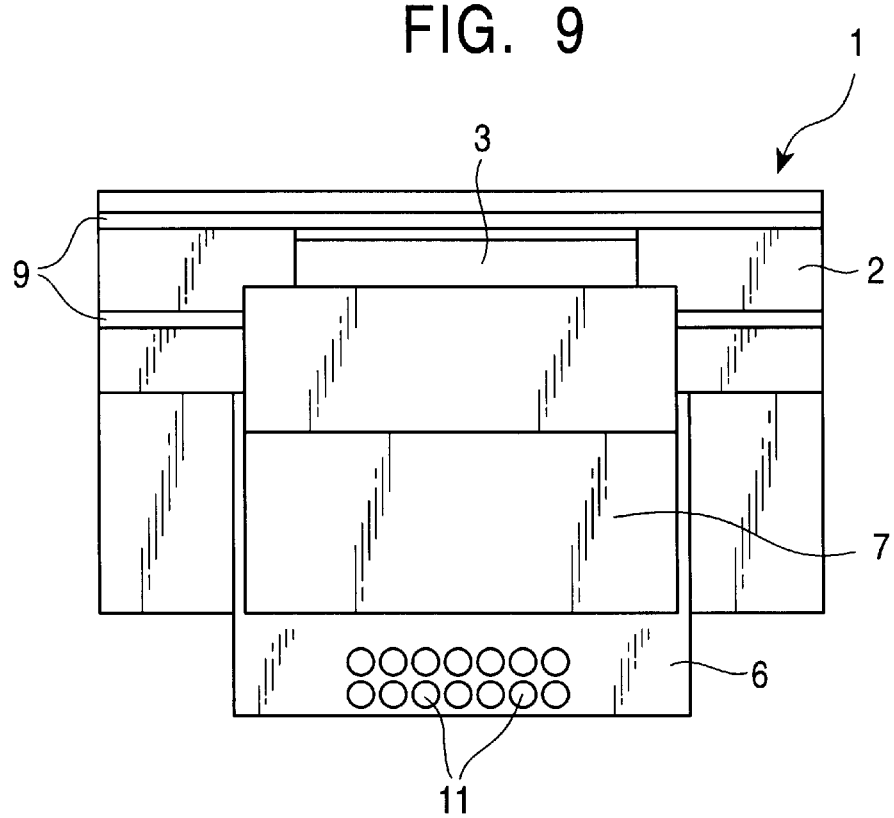
FIG. 9 is a schematic lower view of a state wherein the cover of the printer head according to the same is removed.
Figure 10:
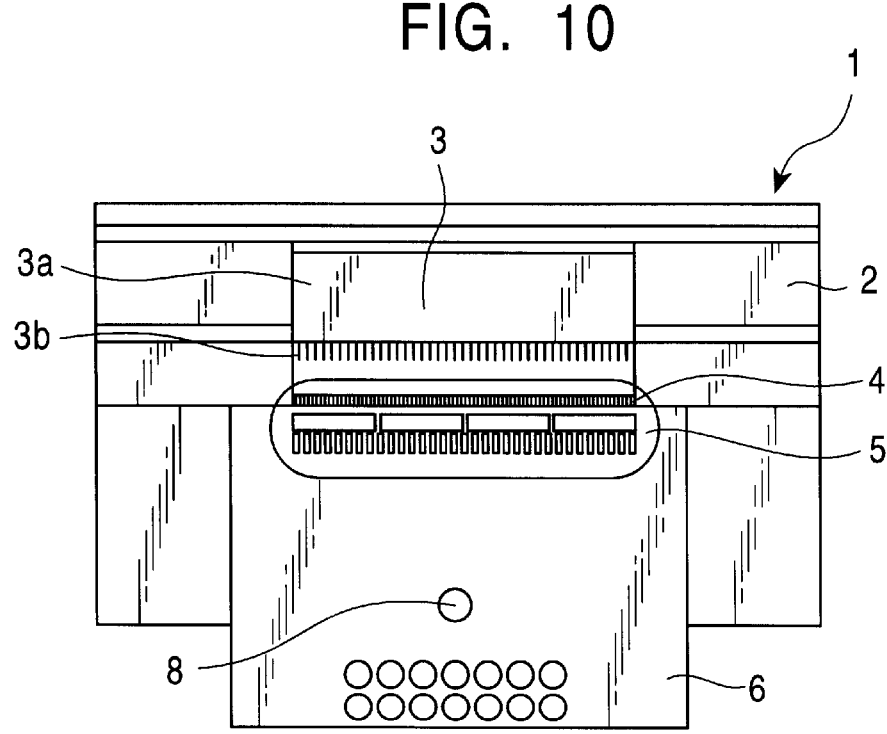
FIG. 10 is a schematic lower view of the printer head according to the same.

FIG. 7 is a schematic cross-sectional diagram illustrating the state in which a printer head performs transfer of a certain image into photographic printing paper, FIG. 8 is a schematic external view showing an external view of the principal portions of the printer head, FIG. 9 is a lower view of the printer head, and FIG. 10 is a lower view of the printer head with the cover of the ink storage portion removed.

As shown in FIGS. 7 through 10, the printer head 1 is configured of a printed board 6 and a head chip (or heater chip) 3 being applied to an aluminum head base 2 also serving as a heat sink using an adhesive agent such as a silicone adhesive agent, and a cover 7 is further applied thereupon using the same adhesive agent.

The head base 2 is reduced in thickness at the portion to which the printed board 6 is to be mounted, by the thickness of the printed board 6, and the height is arranged so that with the printed board 6 attached thereto, the height including the driver IC 5 for driving the heating element (heater) mounted on the printed board 6 is approximately the same height as the upper face of the head chip 3 attached parallel with the printed board 6.

In order that the heater chip 3 is applied evenly to the portion of adhesion of the head chip 3 having the transfer portion, grooves 9 are provided to the surface of the head base 2. Thus, any excessive adhesive agent can escape from these grooves 9 at the time of applying the head chip 3. Also, a silicone coating material JCR (Junction Coating Resin) 4 is applied and subjected the thermal hardening at the junctions between the electrodes on the head chip 32 and the driver IC 5, and the junctions between the driver IC 5 and the wiring pattern on the printed board 6, so as to protect the connecting bonding wires.

Also provided to the printed board 6 is an ink introducing hole 8 passing the head base 2. Liquid ink (not shown) is introduced from the head base 2 side to the area between the cover 7 and the head base 2. Then, a cover 7 is attached and sealed so as to cover part of the printed board 6 and part of the head chip 3, so that the inner surface of this cover 7 receives the ink introduced by the ink introducing hole 8 and forms a common ink supplying channel to supply ink to the divisions off the drawing.

The printer head 1 is arranged such that a certain angle is maintained with the recording medium 12 by bringing one edge 2a of the head base 2 to which the head chip 3 is provided in contact with the recording medium, thereby allowing the gap between the center S of the ink flying area (not shown) and the recording medium 12 to be maintained at a constant.

Accordingly, when printing, the heater is heated by signals corresponding to image data sent via connectors (not shown) provided to the tip of the printed board 6, ink is caused to fly from an unshown ink flying area, and be transferred onto the recording medium 12. The wiring on the printed board 6 is connected to a Flexible Print Circuit (not shown) via connectors, and is used as shown in FIG. 14 (serial method) and FIG. 15 (line method).

Figure 14:
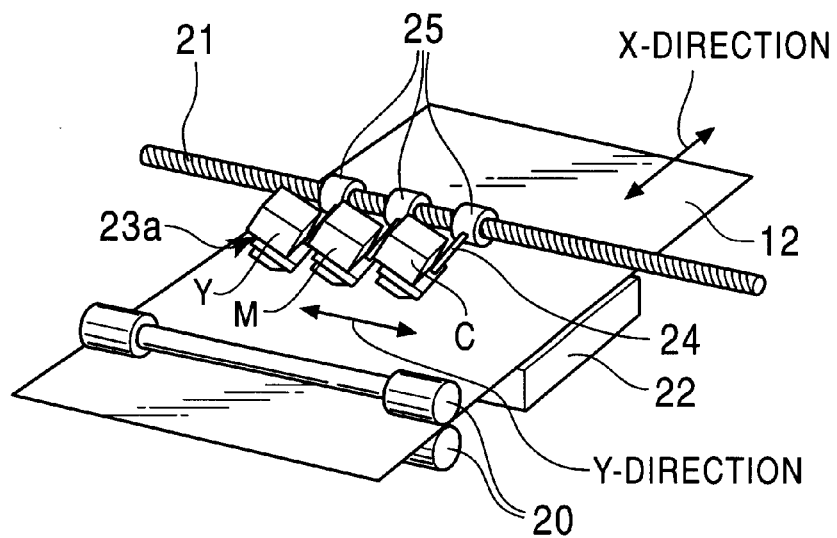
FIG. 14 is a schematic external view of the configuration of a serial color printer using the printer head according to the same.

In the case of the serial method, as shown in FIG. 14, three ink storing portions with dye of the three primary colors Y (yellow), M (magenta), and C (cyan) stored therein (or, black may be added to make four colors) are provided to three (or four, in the case black is added) printer heads 23a arrayed in a parallel manner. The printer heads are linked to moving pieces 25 joined to a feeding shaft 21 via linking members 24. The feeding shaft 21 and the moving pieces 25 are joined in a screw-like manner, so the printer heads Y, M, and C move reciprocally in the direction Y in the Figure according to rotation of the feeding shaft 21, caused by a driving source omitted in the Figure.

On the other hand, a recording medium 12 positioned so as to face the printer heads 23a is moved in the direction of the arrow X in the Figure by a feeding roller 20, for each line of scanning by the printer heads 23a. Accordingly, printing is performed by the printer heads 23a upon the recording medium 12 positioned between the platen 22 and the printer heads Y, M, and C.

Figure 15:
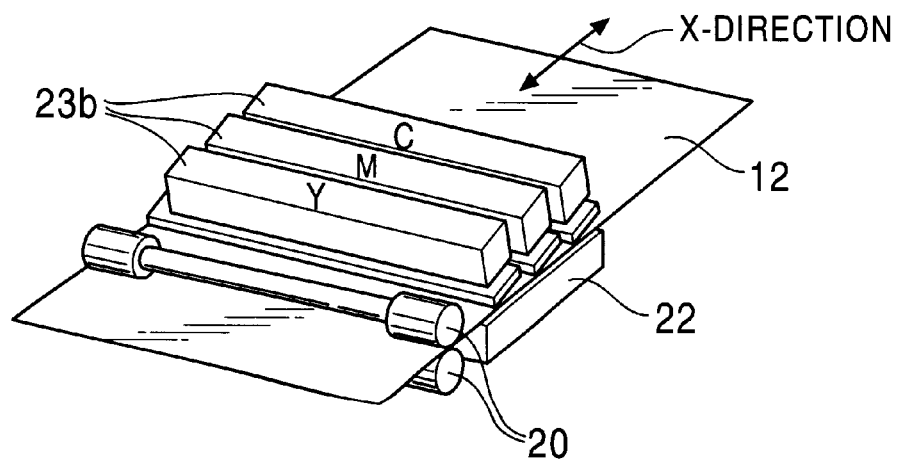
FIG. 15 is a schematic external view of the configuration of a line color printer using the printer head according to the same.
Figure 16:
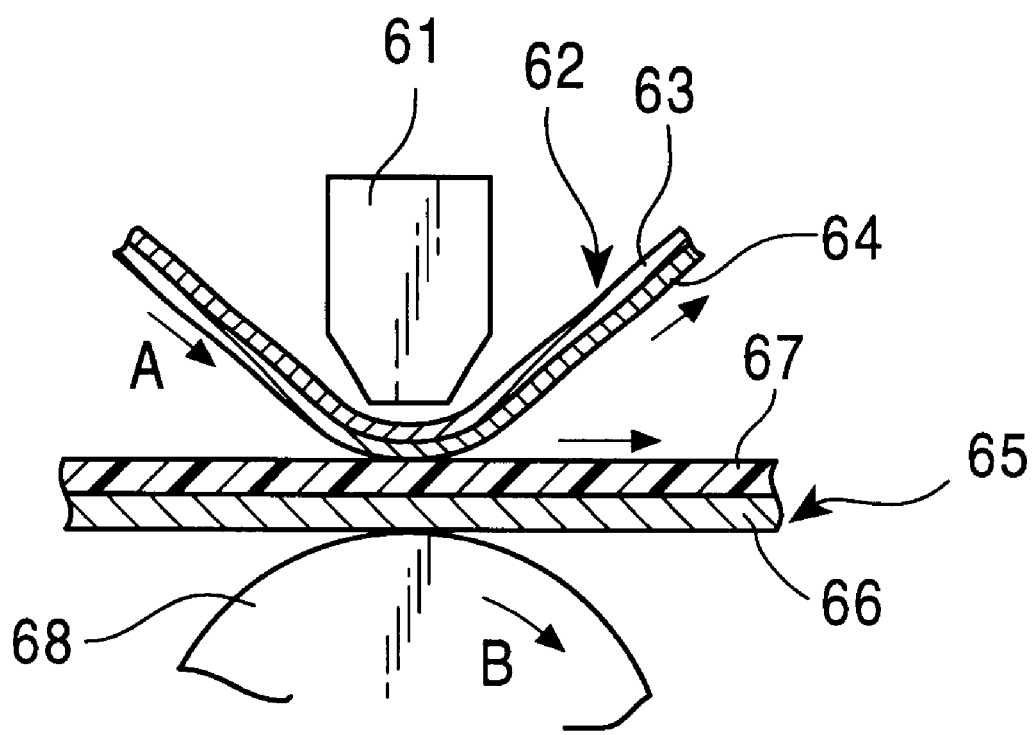
FIG. 16 is a schematic model diagram of the configuration of a known sublimation type thermal transfer printer.

Also, in the case of the line method, as shown in FIG. 15, three ink storing portions with dye of the three primary colors Y (yellow), M (magenta), and C (cyan) stored therein (or, black may be added to make four colors) are provided to three (or four, in the case black is added) printer heads 23b formed to match the width of the recording medium 12 and arrayed in the X direction in the Figure separately for each color.

Accordingly, printing is sequentially performed upon the recording medium 12 positioned so as to face the printer heads Y, M, and C between the printer heads and the platen 22, while the recording medium 12 is moved in the direction of the arrow X in the Figure by a feeding roller 20.

Figure 11:
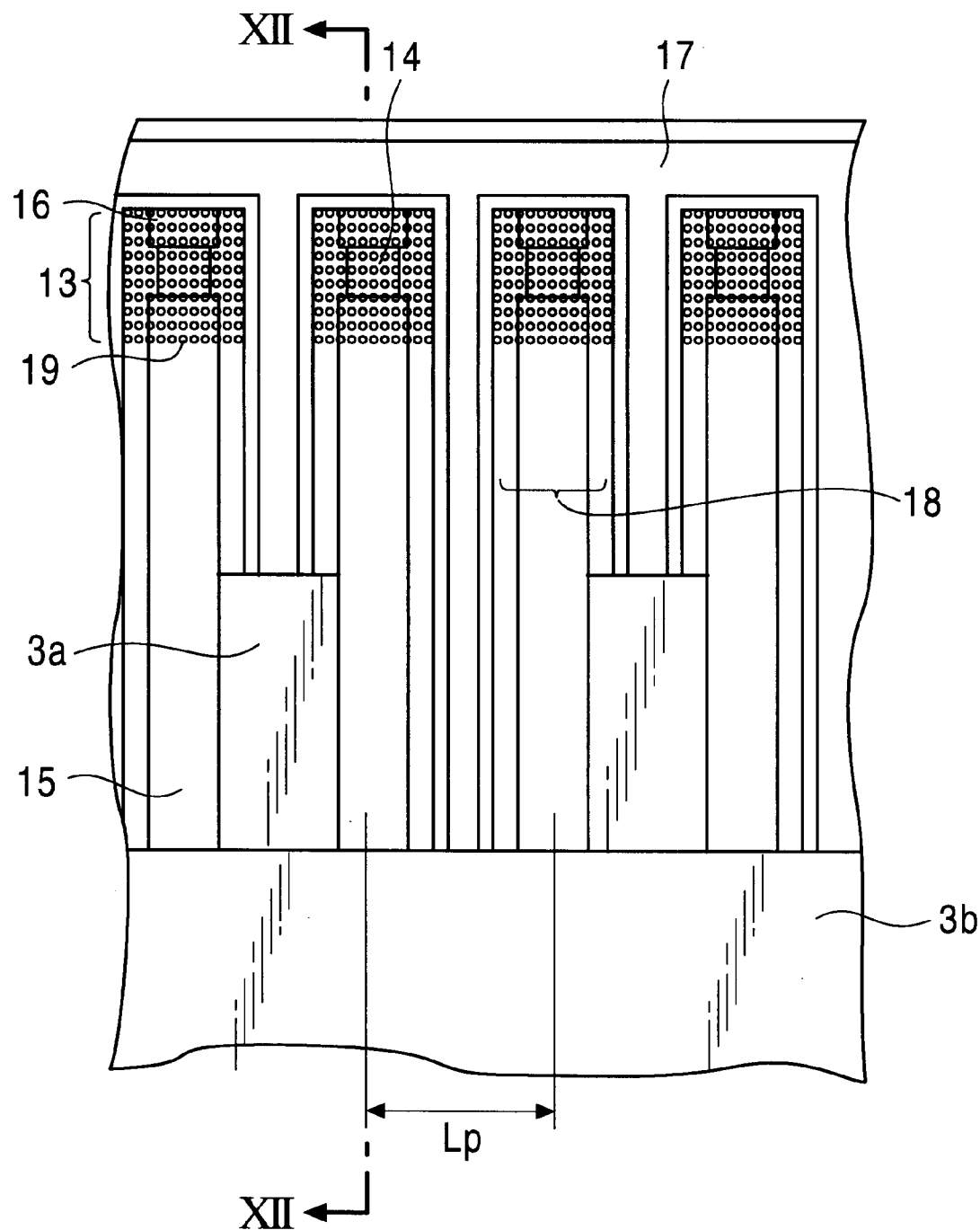
FIG. 11 is a schematic plan view of the area of a transfer portion in the printer head according to the same.
Figure 12:
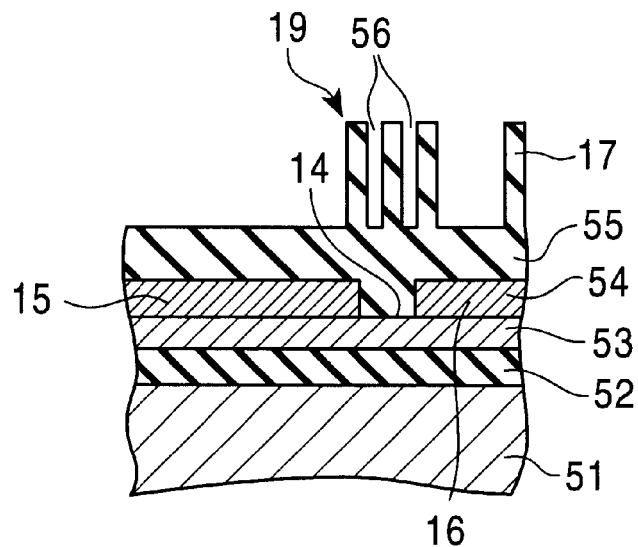
FIG. 12 is a schematic cross-sectional view of the area of a transfer portion in the printer head according to the same, along a portion of line XII—XII in FIG. 11.
Figure 13:
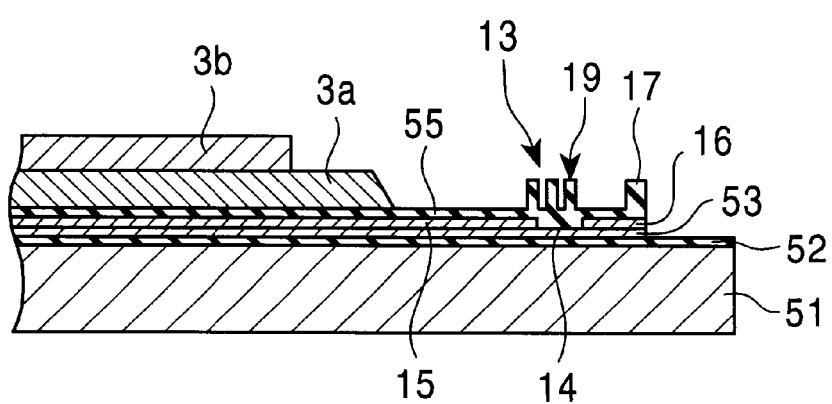
FIG. 13 is another schematic cross-sectional view of the area of a transfer portion in the printer head according to the same.

Now, the configuration near the transfer portion of the printer heads will be described. FIG. 11 is a plan view of the area around the transfer portion, and FIGS. 12 and 13 are cross-sectional diagrams of this area. FIG. 12 is a cross-sectional line along line XII—XII in FIG. 11.

AS shown in FIGS. 12 and 13, the head chip first has a $SiO_2$ layer 52 formed to a thickness of 1 to 2 $\mu$m by thermal oxidation or CVD (Chemical Vapor Deposition) on a heater chip substrate 51 formed of a silicone water with good heat radiation properties (i.e., with high thermo-conductivity). This $SiO_2$ layer 52 serves as a heat-accumulating layer Immediately underneath the heater, so the thickness of the $SiO_2$ layer 52 and the heat radiation properties of the aluminum heat sink needs to be taken into consideration for determining the thickness thereof. A poly-silicone layer 53 is formed on the $SiO_2$ layer 52 to a thickness of around 0.4 $\mu$m by reduced-pressure CVD, so as to serve as a resistor (heat-emitting element). It is preferable that the poly-silicone layer 53 be doped with phosphorous (P) or the like so that the sheet resistance is around 4 k$\Omega$.

Further, an aluminum layer 54 is formed on the poly-silicone layer 53 to a thickness of around 0.5 $\mu$m, by sputtering. Other metals such as gold, copper, platinum, etc., may be us ed as the conductor, instead of aluminum. Incidentally, a heater portion 14 is formed of the poly-silicone layer 53 within the aluminum layer 54, thus forming common electrodes 16 and individual electrodes 15.

Further formed on the aluminum layer 54 by CVD or the like is a $SiO_2$ layer 55 of a thickness around 6 $\mu$m, with post-like structures (small cylinders) 19 serving as ink holding means and a partition 17 forming an ink storage portion being formed within the $SiO_2$ layer 55 according to a certain pattern. It should be noted, however, than the post-like structures 19 are only represented in FIGS. 11 through 13 in model fashion, and the number, form, etc., thereof is not restricted to that represented in the drawings.

Further, as shown in FIG. 13, a dry film (sheet resist) 3a of around 25 $\mu$m in thickness and a nickel sheet 3b of around 25 $\mu$m in thickness are provided in order to form ink supplying channels, thus forming the structure near the transfer portion 13 as shown in FIG. 11.

That is, as shown in FIG. 11, a certain number of heaters 14 formed at a pitch Lp are formed of poly-silicone with the surface area thereof being 20 $\mu$m by 20 $\mu$m for example, and the aluminum individual electrodes 15 and common electrode 16 for applying and conducting signal voltage based on image signals to these heaters 14 are connected thereto.

Also, the transfer portions 13 are separated by partitions 17, such that ink can be stored in the recessions (ink storage portions 18) surrounded by the partitions 17 by means of capillary action. Also, a group of minute post-like structures 19 are formed at the heater 14 and the surrounding area thereof across a $SiO_2$ layer (not shown) serving as a protective film, comprising a part of the components of the transfer portion 13.

The height of the post-like structures 19 is arranged so as to reach from the base of the ink storing portion 18 to the upper surface thereof, i.e., so as to be the same height as the heaters 14 and the partitions 17 surrounding the ink storage portion 18, and furthermore, the post-like structures 19 have minute gaps 56 therebetween so as to be a porous structure. Accordingly, the porous structure generates capillary action, and the post-like structures 19 are capable of holding ink within the ink storage portion 18. Also, capillary action continuously supplies necessary ink as ink is caused to fly.

The following is a description of a specific embodiment of the present invention; however, it should be noted that the present invention is by no means restricted to this embodiment.

<Structure of the Printer Head>

Here, the printer head having the structure shown in the above-described FIGS. 7 through 13 are used to form the serial-type printer shown in FIG. 14.

First, as shown in FIGS. 7 through 10, the printer head 1 is mounted with an aluminum head base 2 also serving as a heat sink, a heater chip 3 integrally forming transfer portions heated by heaters according to image information and recording liquid introducing channels for introducing the recording liquid to the transfer portion by capillary action, and a driver IC 5 covered with potting resin (Junction Coating Resin, JCR) 4, has a printed board 6 upon which wiring is formed for supplying electrical current to the heaters according to the image data to be transferred, and a cover 7 for protecting the driver IC 5 and also serving as a supply channel for the dye.

Now, formed in the head base 2 is an ink introducing hole 8 for introducing ink into the printer head 1, and grooves 9 for allowing excessive adhesive agent to escape when applying the heater chip 3 to the head base 2. The interior of the cover 7 serves as an ink supplying channel (or ink storing portion) 10 for supplying ink to the ink introducing channel of the heater chip 3. Also, connector terminals 11 are provided to the printed board 6.

The surface of the heater chip 3 is covered with an Ni sheet 3a for the purpose of protection, and sheet resist 3b forming ink introducing channels is laid out in linear fashion therein.

The heater chip 3 is also formed of multiple heaters for generating surface tension convection by heating, wiring for applying and conducting signal voltage based on image signals to the heaters, and ink interdicting channels for supplying ink to each of the heaters, these being formed by application of the lithography process.

That is, as shown in FIG. 11, a total of 256 heaters 14 are formed at a pitch of Lp=84.7 $\mu$m. At this time, each heater 14 transfers one dot, so resolution of 300 dpi can be realized. Each of the heaters 14 is formed of poly-silicone with a surface size of 20 $\mu$m by 20 $\mu$m, and aluminum individual electrodes 15 and common electrode 16 for applying and conducting signal voltage based on image signals to these heaters 14 are connected thereto.

Now, the transfer portions 13 are separated by partitions 17, such that ink can be stored in the recessions (ink storage portions 18) surrounded by the partitions 17 by means of capillary action. Also, a group of cylindrical minute post-like structures 19, each being 2 $\mu$m in diameter, spaced by 2 $\mu$m, and 6 $\mu$mm in height, are formed in a group of 13 by 13 at the heater 14 and the surrounding area thereof across a $SiO_2$ layer (not shown) serving as a protective film, thus comprising a part of the components of the transfer portion 13 (however, a portion of the post-like structures have been omitted in FIG. 11).

The height of the post-like structures 19 is arranged so as to reach from the base of the ink storing portion 18 to the upper surface thereof, i.e., so as to be the same height as the heaters 14 and the partitions 17 surrounding the ink storage portion 18, and furthermore, the post-like structures 19 have minute gaps 56 therebetween so as to be a porous structure. Accordingly, the porous structure generates capillary action, and the post-like structures 19 are capable of holding ink within the ink storage portion 18. Also, heating of the ink with the heaters 14 decreases the surface tension of the ink in accordance with the temperature thereof rising, but capillary action prevents the ink from escaping from the region of the heaters 14, and necessary ink is continuously supplied when transferring images.

As shown in FIG. 7, the printer head 1 is arranged such that a certain angle is maintained with the recording medium 12 by one edge 2a being in contact therewith. This maintains the gap between the transfer portion 13 and recording medium 12 at a constant.

Also, the center S of the heater 14 of the transfer portion 13 was configured to be at a position 1.85 mm from the head base edge 2a coming into contact with the recording medium 12, and the angle between the head base 2 and the recording medium 12 was set at 14° in order to set the distance between the heater 14 formed on the 0.4 mm-thick silicone substrate and the recording medium at 50 $\mu$m (with the thickness of the adhesive layer between the silicone substrate and the head base being calculated at 10 $\mu$m).

In this way, the distance between the heater 14 and recording medium 12 can be set to an arbitrary size, by changing the distance from the head base tip 2a to the center position S of the heater, and the angle between the recording medium 12 and the head base 2.

Also, used for the printer was a serial type printer having printer heads Y, M, and C, for each of the colors yellow (Y), magenta (M), and cyan (C), as described above and shown in FIG. 14. Each of the printer heads 23a are connected to a head driving circuit board (not shown) via a flexible harness.

This serial type printer has a rotating sheet-feeding roller 20 for transporting photographic printing paper 12 in the vertical direction (X-direction), and a head feeding shaft 21 for scanning the printer heads 23a in a direction at a right angle with the X direction (i.e., Y-direction), so the head feeding shaft 21 is rotated by a motor (unshown) according to image information, thereby scanning the printer head 1. The paper feed in the vertical direction and head scan in the horizontal direction are performed alternately.

Now, 256 heaters 14 are provided to each of the printer heads Y, M, and C, so at the point that one scan is completed, the photographic printing paper 12 on the platen 22 can be fed by 256 lines with the paper feeding roller 20 also serving as a head support, and the timing can be sequentially changed for each color so that the heads for the colors Y, M, and C start printing at a certain position on the photographic printing paper 12, thus allowing printing of a color image with a single scan.

Also, a color printer (see FIG. 15) having a line configuration may be used instead of the serial printer shown in FIG. 14.

<Ink and Transfer Tests>

A certain image was printed using the printer head of the configuration described above, employing ink containing solvents of the types and temperatures properties shown in the following Table 1A, with 256 heat pulses of 80 mW in power being applied within 4 ms to form one pixel, under a scanning speed of 2 cm/sec. The head temperature at this time is 170° C. Also, in the first through fifth embodiments, the concentration of the dye in the ink was 3% by weight in all cases, and Solvent Blue 35 was used for the dye in all cases.

The color concentration (OD concentration) of the printed image was measured with a Macbeth densitometer. The results thereof are shown in the following Table 1A. The change in transfer concentration according to the temperature coefficient of the surface tension regarding the first through fifth embodiments is shown in FIG. 1 in the form of a graph.

TABLE 1A

|  | Solvent | | | Temperature coefficient of surface tension | Transfer Concentration (OD) |
| --- | --- | --- | --- | --- | --- |
|  | Type of solvent | Solidifying point | Boiling point | | |
| First Embodiment | Diphenyl-sulfide | −40 | 296 | −0.101 | 2.9 |
| Second Embodiment | 1-phenyl naphthalene | −44 | 324 | −0.110 | 3.0 |
| Third Embodiment | Benzyl-benzoate | 18 | 323 | −0.096 | 2.6 |

TABLE 1A-continued

| | Solvent | | | Temperature coefficient of surface tension | Transfer Concentration (OD) |
|---|---|---|---|---|---|
| | Type of solvent | Solidifying point | Boiling point | | |
| Fourth Embodiment | Methyl-2-nitro-benzoate | −13 | 338 | −0.134 | 3.1 |
| Fifth Embodiment | P-dichloro-benzene | 54 | 173 | −0.0879 | 2.0 |

*The unit for "Temperature coefficient of surface tension" is "dyn/cm · K".

Next, the color concentration (OD concentration) of the printed images were measured with a Macbeth densitometer in the same manner as with the first through fifth embodiments, with only the solvents changed. The measurement results are shown in the following Table 1B. The change in transfer concentration according to the temperature coefficient of the surface tension is also shown in FIG. 1 for the first and second comparative examples, as well.

TABLE B

| | Type of solvent | Temperature properties of solvent | Temperature coefficient of surface tension | Transfer concentration (OD) |
|---|---|---|---|---|
| First comparative example | Tristearin | liquid between 60 to 130° C. | −0.068 | 1.2 |
| Second comparative example | Veratrole | liquid between 25 to 180° C. | −0.064 | 1.0 |

*The unit for "Temperature coefficient of surface tension" is "dyn/cm # K".

As shown in Table 1A and Table 1B and FIG. 1, using a solvent with a surface tension temperature coefficient of −0.07 (dyn/cm·K) or greater realized a transfer concentration (OD) of 1.5 times, which is considered to be minimally necessary for practical recording, as shown with the first through fifth embodiments Further, it can be understood from FIG. 1 that having the surface tension temperature coefficient C at −0.08 (dyn/cm·K) or greater achieves a transfer concentration of 1.7 or greater, and having the surface tension temperature coefficient C at −0.10 (dyn/cm·K) or greater achieves a transfer concentration of 2.5 or greater. Particularly, having the surface tension temperature coefficient C at −0.11 (dyn/cm·K) or greater achieves a transfer concentration (OD) of 3.0 or greater.

That is, the ink shown in the first through fifth embodiments have an absolute value of surface tension temperature coefficient of 0.07 dyn/cm·K or greater, a sufficient surface tension inclination is generated, consequently generating a sufficient amount of ink mist, thereby forming an image with sufficient color concentration. Accordingly, high speed printing can be performed with high transfer concentration.

According to the recording material of the present invention, the recording material which flies and is transferred to the recording medium due to surface tension convection caused by the surface tension inclination has an absolute value of surface tension temperature coefficient C of 0.07 dyn/cm·K or higher, so the surface tension of the recording material sharply responds to change in temperature, thus generating a sufficient surface tension inclination, consequently effectively generating the flow, thereby improving transfer efficiency.

With the recording method according to the present invention, heating recording material held in a transfer portion with a heating means causes the recording material to fly and be transferred onto a recording medium positioned opposing a transfer portion; wherein the recording material has an absolute value of surface tension temperature coefficient C of 0.07 dyn/cm·K or higher, and wherein the heating causes surface tension inclination at the surface of the recording material, generating flow which causes the recording material to fly, so that the surface tension of the recording material sharply responds to change in temperature, thus generating a sufficient surface tension inclination, consequently effectively generating the flow, thereby improving transfer efficiency.

What is claimed is:

1. A recording material comprising a solvent having a boiling point of 200° C. or higher and a dye, said recording material having a surface tension temperature coefficient C represented by $|C| \geq 0.07$ (dyn/cm·K);

wherein, upon sufficient heating, a surface tension inclination is produced in said recording material, thereby generating flow which causes said recording material to fly and be transferred onto a recording medium positioned opposing a transfer portion having a recording material holding structure for holding said recording material by capillary phenomena.

2. A recording material according to claim 1, which flies owing to surface tension convection, caused by said surface tension inclination.

3. A recording material according to claim 1, wherein the difference in surface tension between the area heated by said heating and the surrounding areas thereof is 5 dyn/cm or greater.

4. A recording material according to claim 1, wherein said solvent accounts for 80% by weight or more in said recording material, and said dye accounts for 1% by weight or more therein.

5. A recording material according to claim 1, wherein the temperature range for maintaining the liquidity of said solvent is between −40° C. and 200° C.

6. A recording material according to claim 1, wherein the solvent comprises at least one solvent selected from the group consisting essentially of diphenyl sulfide, 1-phenyl naphthalene, benzyl benzoate, and methyl-2-nitrobenzoate.

7. A recording material according to claim 1, wherein the recording material further comprises at least one additive.

8. A recording method of heating recording material, comprising:

holding said recording material by capillary phenomena in a recording material holding structure of a transfer portion having a heating means;

heating said recording material in said transfer portion;

causing surface tension inclination at the surface of said recording material;

generating flow of said recording material in said transfer portion; and causing said recording material to fly and be transferred onto a recording medium positioned opposite said transfer portion;

wherein said recording material comprises a solvent having a boiling point of 200° C. or higher and a dye and has a surface tension temperature coefficient C represented by:

$|C| \geq 0.07$ (dyn/cm·K).

9. A recording method according to claim 8, wherein said recording material flies owing to surface tension convection, caused by said surface tension inclination.

10. A recording method according to claim 8, wherein the difference in surface tension between the area heated by said heating and the surrounding areas thereof is 5 dyn/cm or greater.

11. A recording method according to claim 8, wherein said solvent accounts for 80% by weight or more in said recording material, and said dye accounts for 1% by weight or more therein.

12. A recording method according to claim 8, wherein the temperature range for maintaining the liquidity of said solvent is between −40° C. and 200° C.

13. A recording method according to claim 8, wherein said recording material is provided with thermal inclination by heating with said heating means, and at least said surface tension inclination is generated according to said thermal inclination, and using the flow in said recording material as a driving force to cause said recording material to fly in a mist form.

14. A recording method according to claim 13, wherein the flow of said recording material is generated from the heating area by said heating means toward the surrounding area, or in the reverse direction.

15. A recording method according to claim 13, wherein the flow of said recording material is caused by at least Marangoni flow owing to said surface tension inclination, of the following Marangoni flows:

Marangoni flow owing to said surface tension inclination of said recording material due to said temperature inclination;

Marangoni flow owing to said interface tension inclination between said recording material and the base plane of said transfer portion due to said temperature inclination;

Marangoni flow owing to concentration distribution of the material comprising said recording material; or Marangoni flow owing to selective vaporization of surface-active agents included in said recording material.

16. A recording method according to claim 8, wherein heating by said heating means is performed periodically, thereby causing said recording material to flow periodically.

17. A recording method according to claim 8, wherein said recording material holding structure is of a fine jagged structure, said structure comprising a part of said recording material holding means.

18. A recording method according to claim 8, wherein the solvent comprises at least one solvent selected from the group consisting essentially of diphenyl sulfide, 1-phenyl naphthalene, benzyl benzoate, and methyl-2-nitrobenzoate.

19. A recording method according to claim 8, wherein the recording material further comprises at least one additive.

20. An inkjet printer comprising
(a) a recording material comprising a solvent having a boiling point of 200° C. or higher and a dye, wherein said recording material has a surface tension temperature coefficient C represented by $$|C| \geq 0.07 \text{ (dyn/cm·K)};$$

(b) a transfer portion having a recording material holding structure for holding said recording material by capillary phenomena and a means for heating said recording material to cause surface tension inclination; and (c) a recording medium positioned opposite of said transfer portion;

wherein said heating means generates flow which causes said recording material to fly and be transferred onto said recording medium.

21. An ink-jet printer according to claim 20, wherein the solvent comprises at least one solvent selected from the group consisting essentially of diphenyl sulfide, 1-phenyl naphthalene, benzyl benzoate, and methyl-2-nitrobenzoate.

22. An ink-jet printer according to claim 20, wherein the recording material further comprises at least one additive.

23. An ink-jet printer according to claim 20, wherein the recording material flies owing to surface tension convection, caused by said surface tension inclination.

24. An ink-jet printer according to claim 20, wherein the difference in surface tension between the area heated by said heating means and the surrounding areas thereof is 5 dyn/cm or greater.

25. An ink-jet printer according to claim 20, wherein said solvent accounts for 80% by weight or more in said recording material, and said dye accounts for 1% by weight or more therein.

26. An ink-jet printer according to claim 20, wherein the temperature range for maintaining the liquidity of said solvent is between −40° C. and 200° C.

* * * * *